United States Patent
Sisson

[11] Patent Number: 6,155,646
[45] Date of Patent: *Dec. 5, 2000

[54] PORTABLE STOOL

[76] Inventor: Michael Lewis Sisson, 505 County Rd. #172, Athens, Tenn. 37303

[*] Notice: This patent issued on a continued prosecution application filed under 37 CFR 1.53(d), and is subject to the twenty year patent term provisions of 35 U.S.C. 154(a)(2).

[21] Appl. No.: 08/985,232

[22] Filed: Dec. 4, 1997

Related U.S. Application Data

[63] Continuation-in-part of application No. 08/897,971, Jul. 21, 1997.

[51] Int. Cl.[7] ............................................. A47C 3/00
[52] U.S. Cl. ..................... 297/451.4; 297/461; 248/407
[58] Field of Search .................................. 182/206, 116, 182/187; 297/4, 461, 451.4; 248/121, 126, 407, 219.4

[56] References Cited

U.S. PATENT DOCUMENTS

| | | | |
|---|---|---|---|
| 1,149,786 | 8/1915 | Rowley | 182/187 X |
| 2,308,142 | 1/1943 | Alloway | 248/121 X |
| 3,336,999 | 8/1967 | McSwain | 182/206 X |
| 3,381,635 | 5/1968 | Pforr | 297/461 X |
| 4,061,202 | 12/1977 | Campbell | 182/116 X |
| 4,098,478 | 7/1978 | Spitzke | 297/4 X |
| 4,101,163 | 7/1978 | Morin | 297/4 X |
| 4,138,156 | 2/1979 | Bonner | 297/4 |
| 4,257,490 | 3/1981 | Bandy | 182/116 |
| 4,552,246 | 11/1985 | Thomas | 182/116 |
| 4,787,476 | 11/1988 | Lee | 182/187 X |
| 5,064,020 | 11/1991 | Eagleson | 182/116 X |
| 5,195,611 | 3/1993 | Untz | 182/116 X |
| 5,253,732 | 10/1993 | Daniels | 182/116 |
| 5,275,257 | 1/1994 | Robertson | 182/187 X |
| 5,282,520 | 2/1994 | Walker | 182/116 |
| 5,303,981 | 4/1994 | Wilder et al. | 297/14 X |
| 5,332,063 | 7/1994 | Amacker | 182/206 X |
| 5,720,522 | 2/1998 | Habeck | 297/4 X |

FOREIGN PATENT DOCUMENTS

| | | | |
|---|---|---|---|
| 489147 | 12/1929 | Germany | 182/116 |
| 374569 | 6/1932 | United Kingdom | 297/4 |
| 106582 | 3/1967 | United Kingdom | 182/116 |
| 2221241 | 10/1990 | United Kingdom | 182/116 |

*Primary Examiner*—Carl D. Friedman
*Assistant Examiner*—David E. Allred
*Attorney, Agent, or Firm*—John H. Miller

[57] ABSTRACT

A portable stool useful for hunting, spectator events, and other uses which can be supported by any generally vertical surface such as a tree, wall, post, etc. and the ground is disclosed. The stool can be easily and quickly converted from a use mode into a compact mode for easy carrying and storage and back to a use mode. The preferred stool has a primary support member, a secondary support member, preferably pivotly attached to said primary support member, having a fork on one end, and a seat. The seat can be padded and preferably locks onto either the primary support member or the secondary support member, or both, in the compact mode. The primary support member can also have projections for attaching to a rope or cable making the stool also useful as a handle to pull or drag a heavy object such as large game.

21 Claims, 13 Drawing Sheets

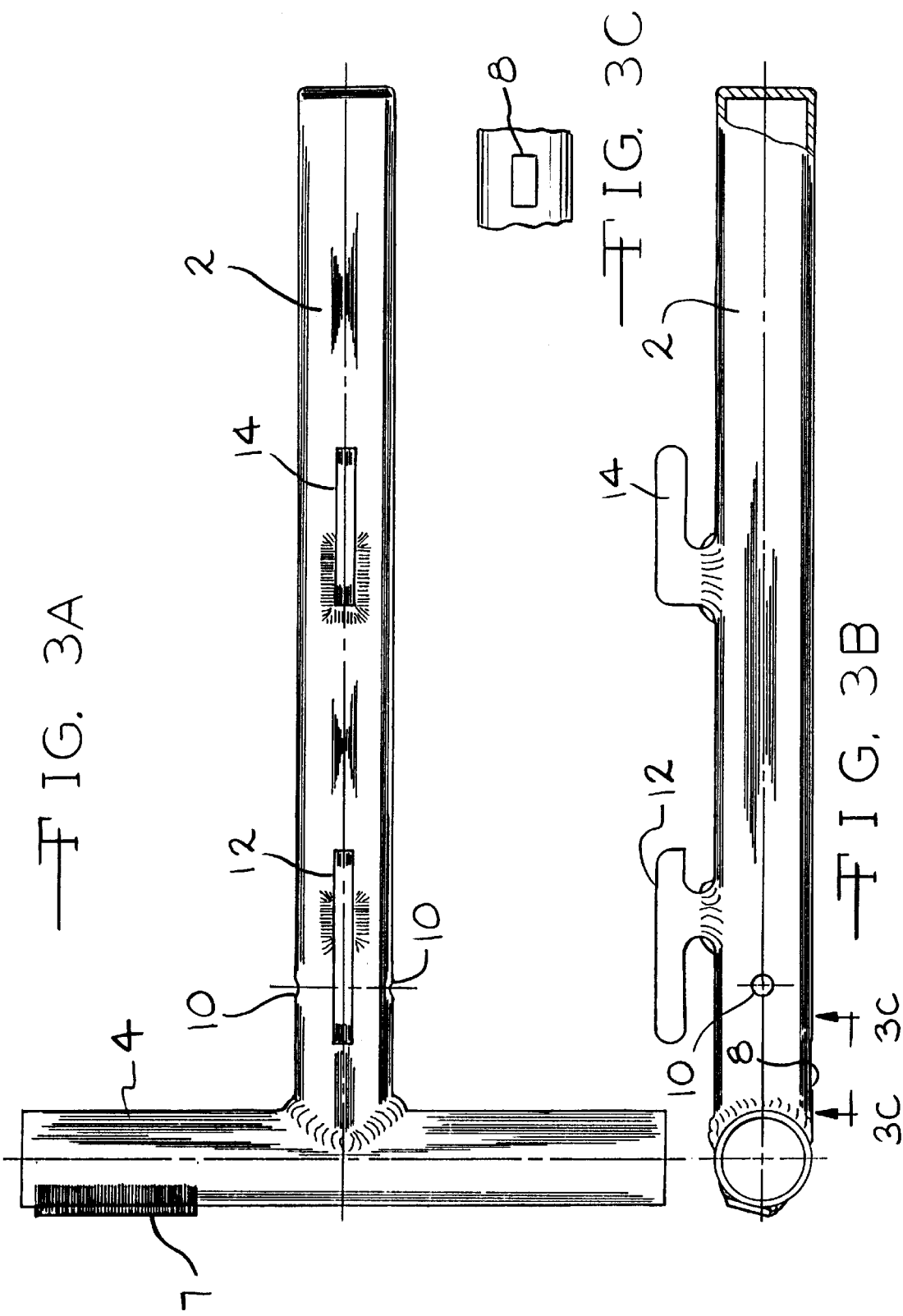

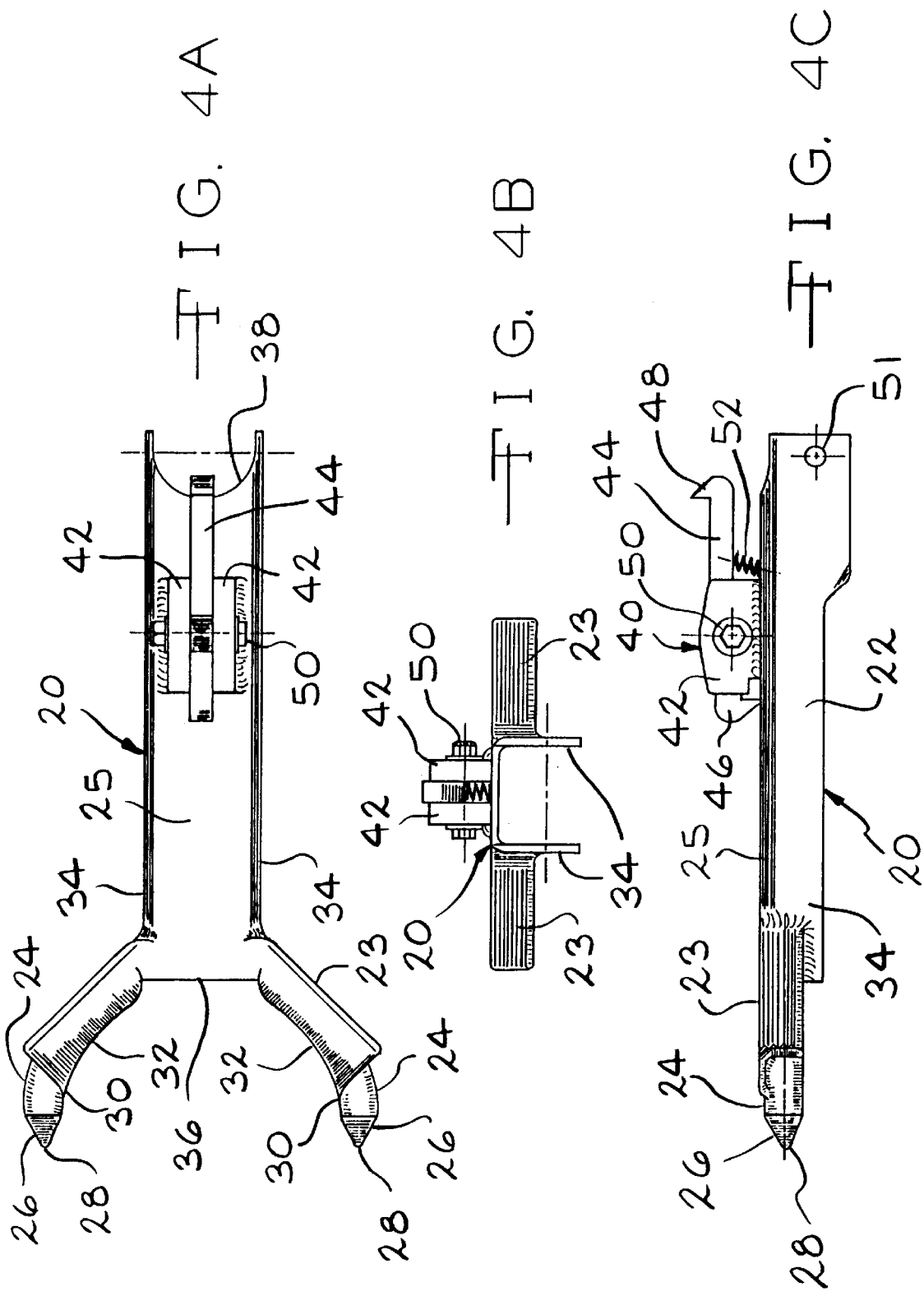

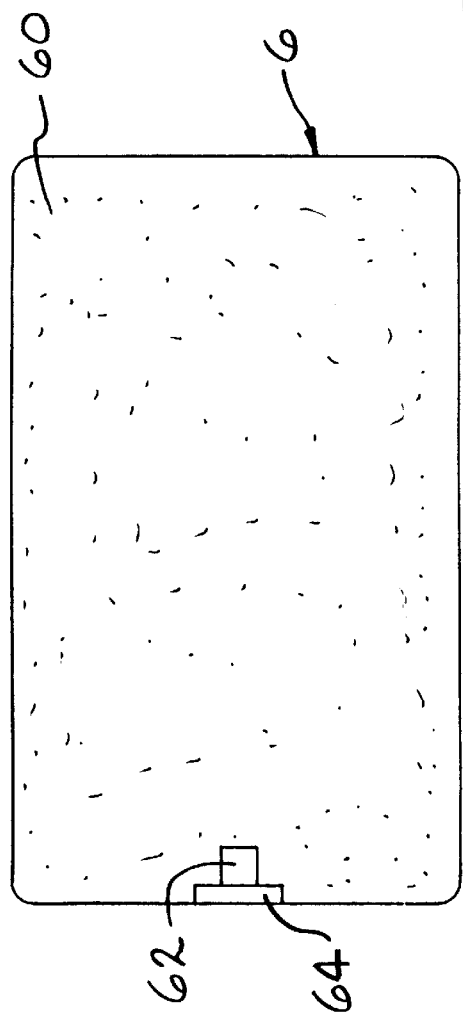
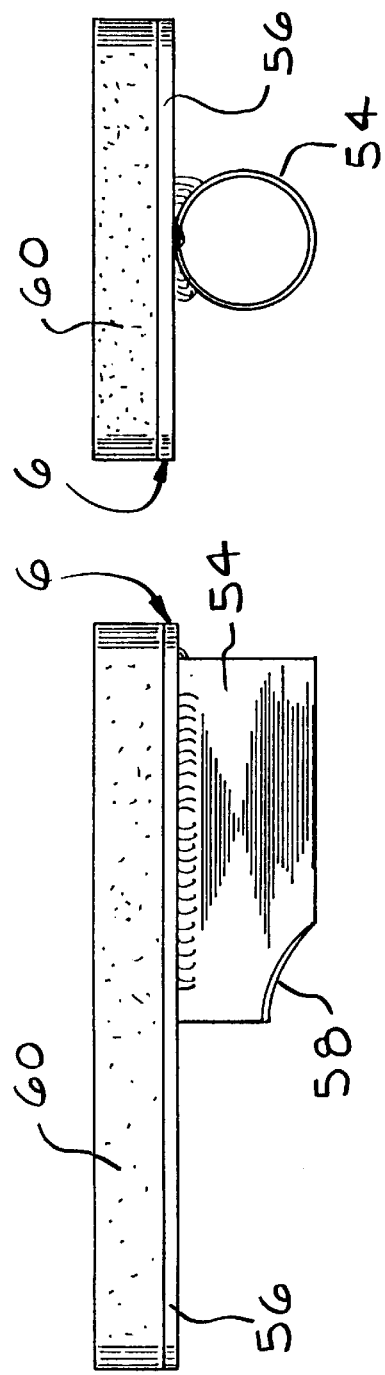

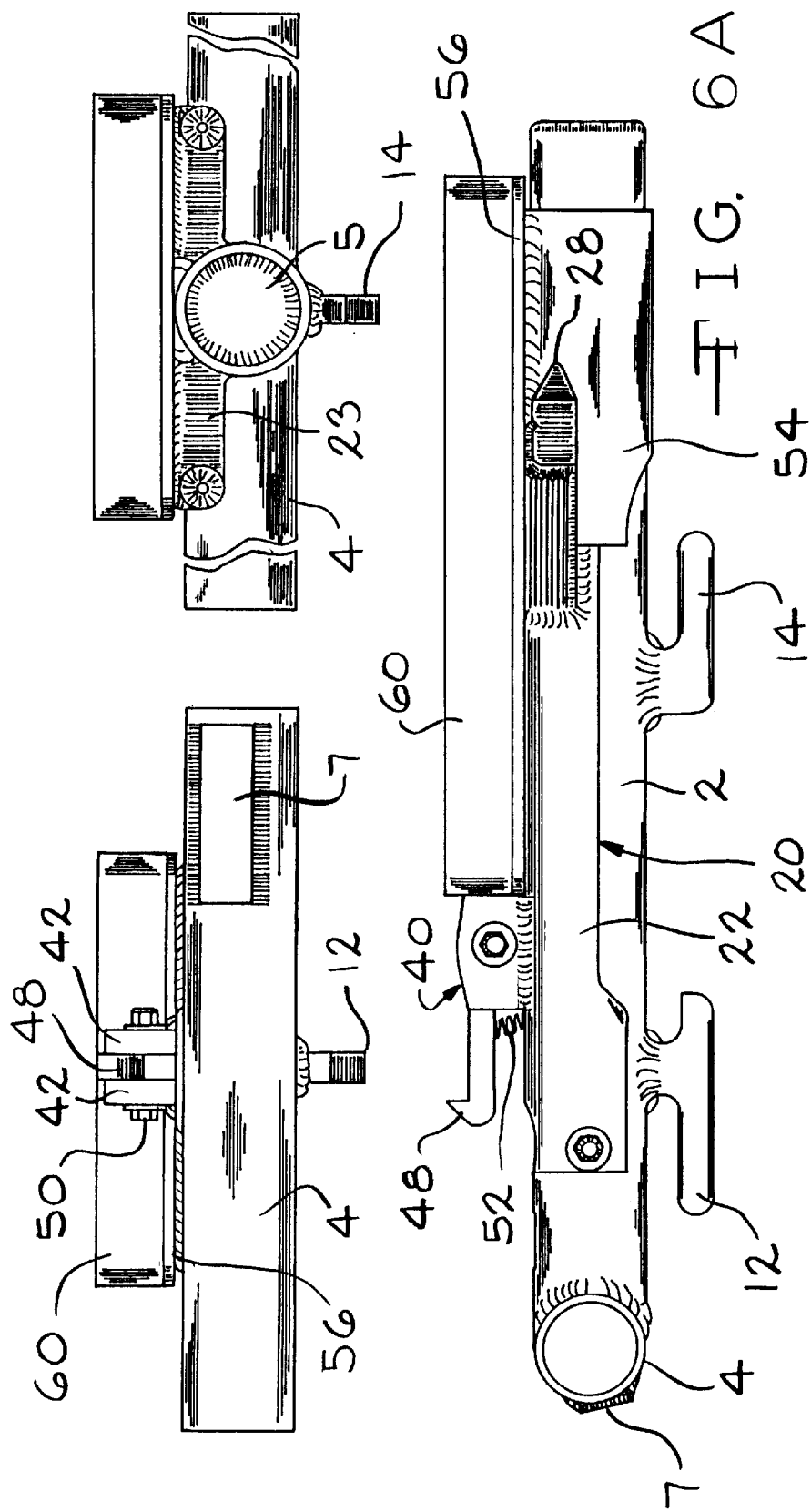

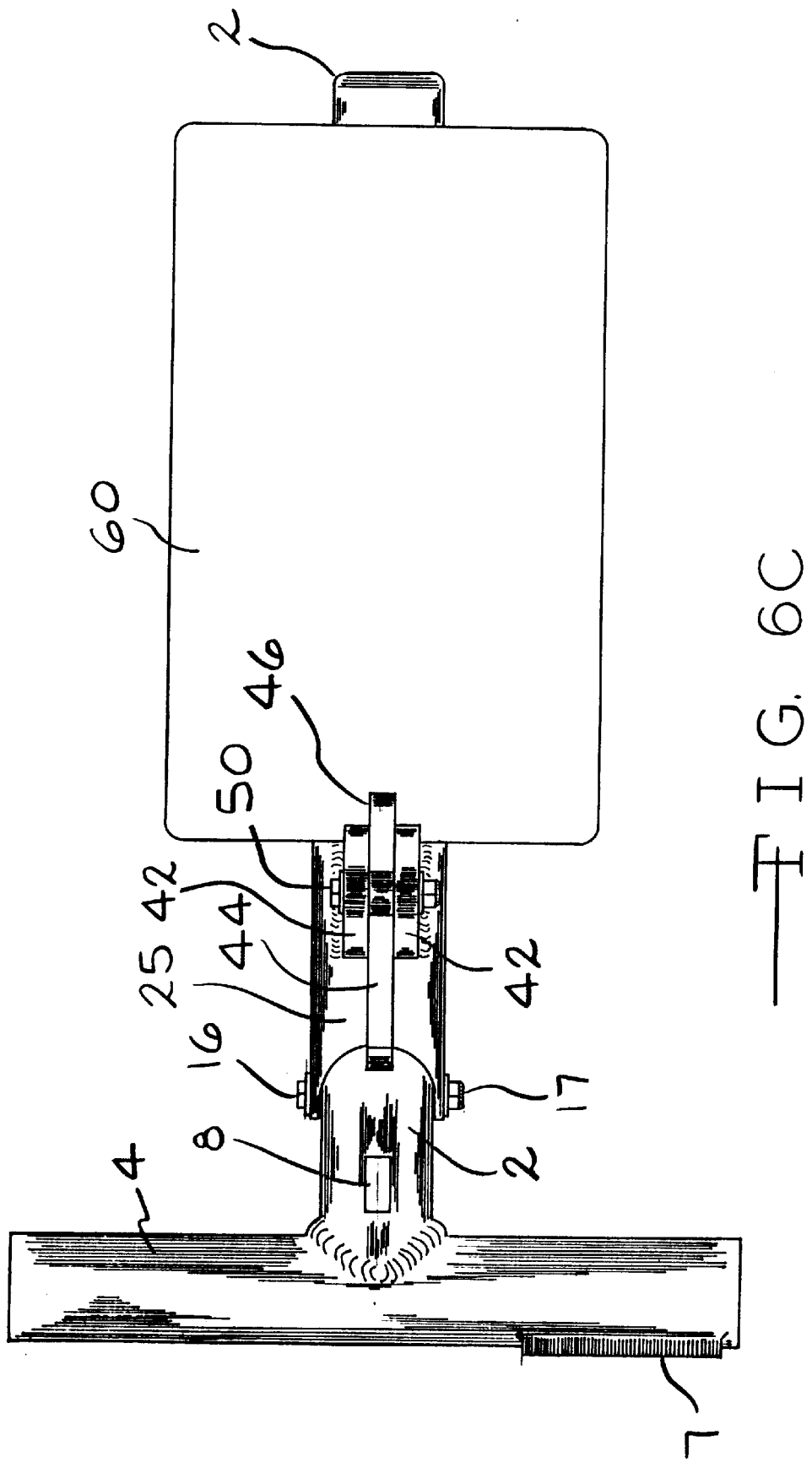

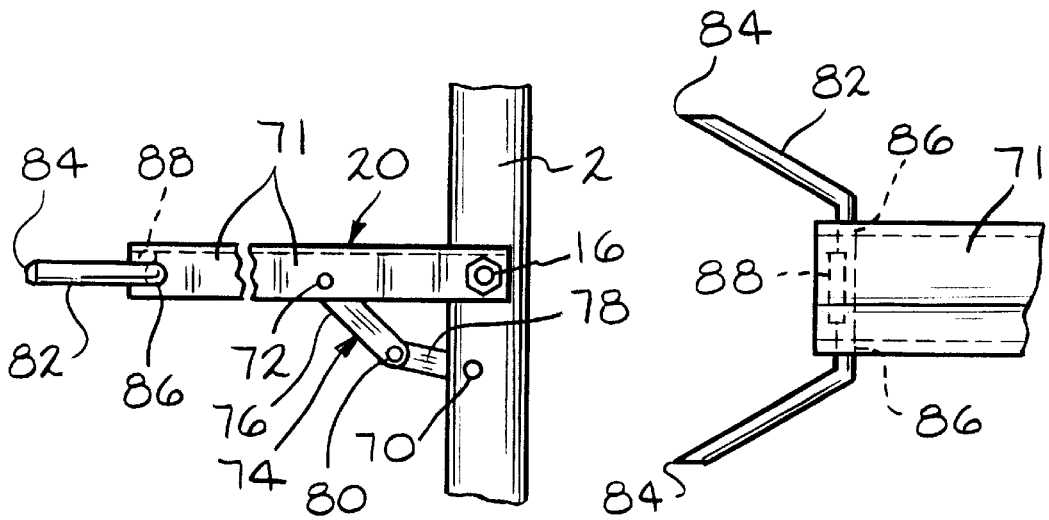
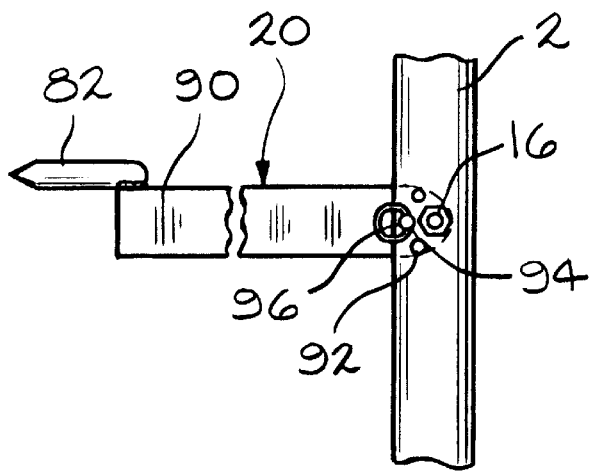
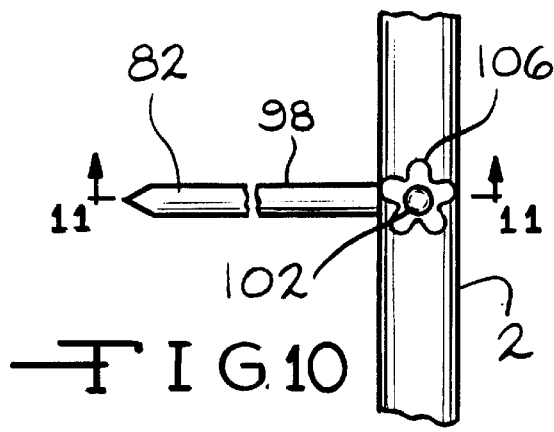

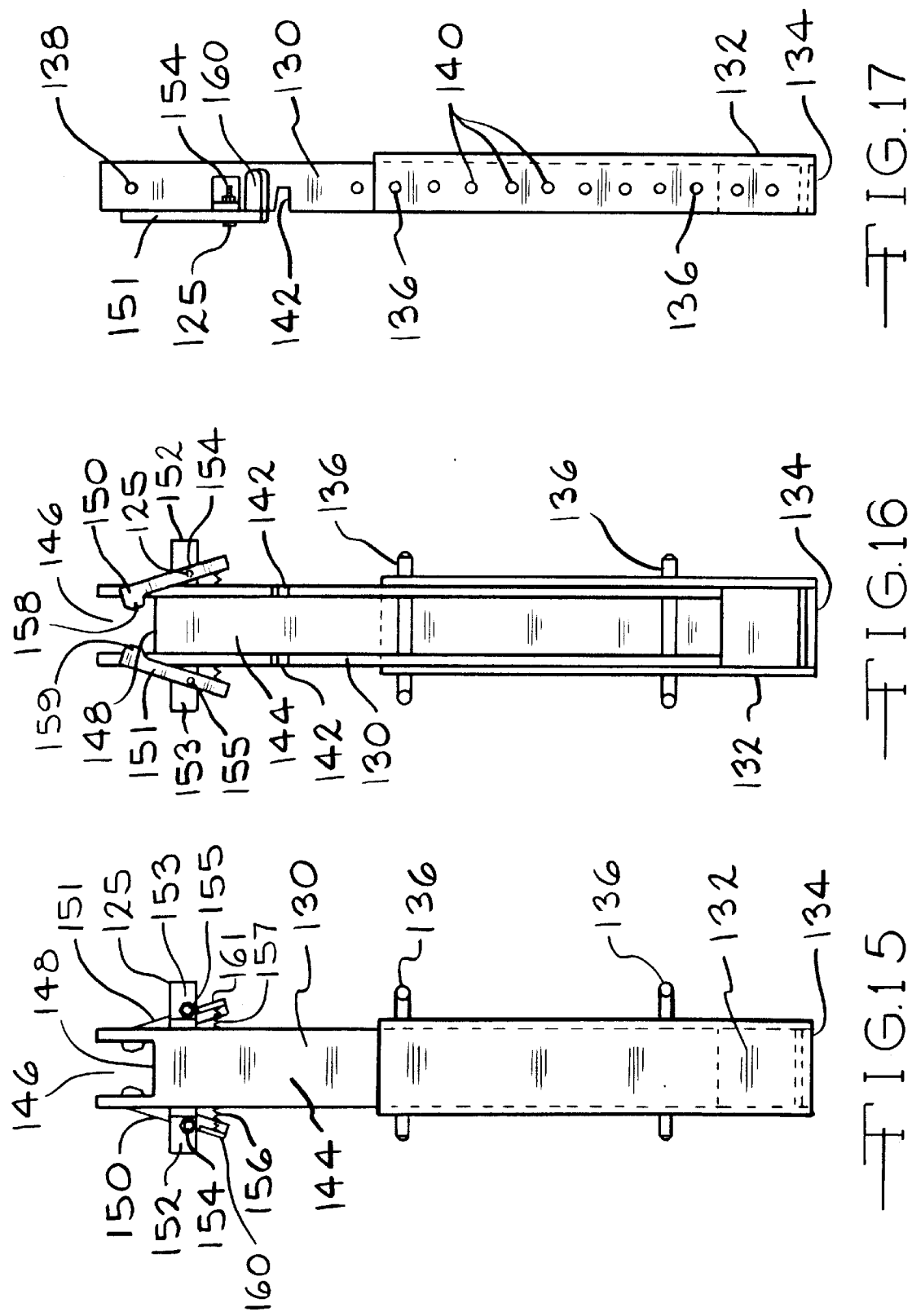

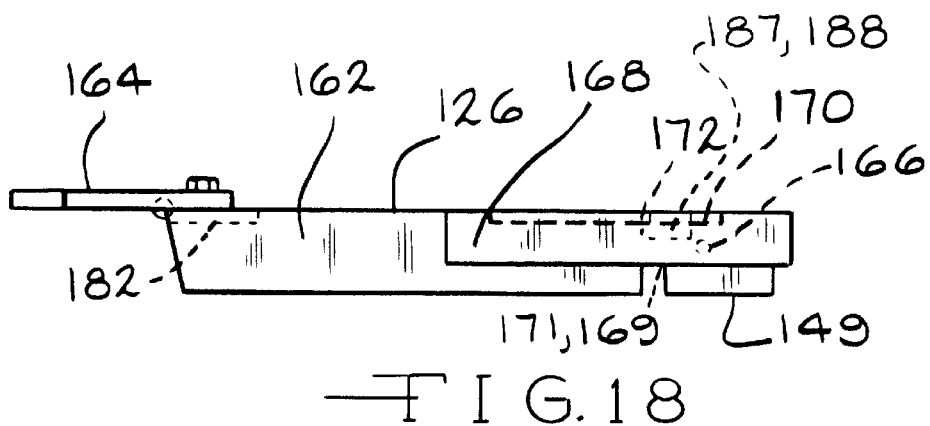
FIG. 18
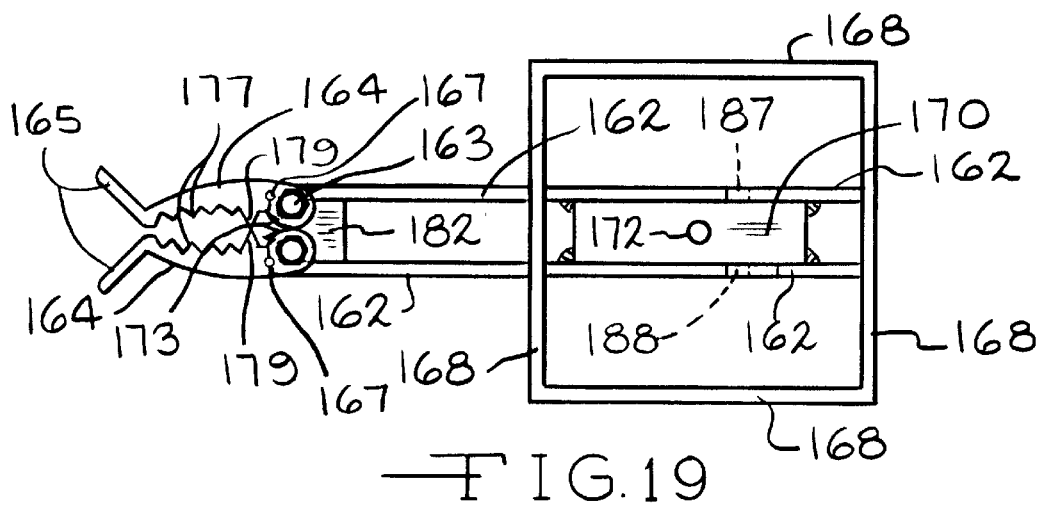
FIG. 19
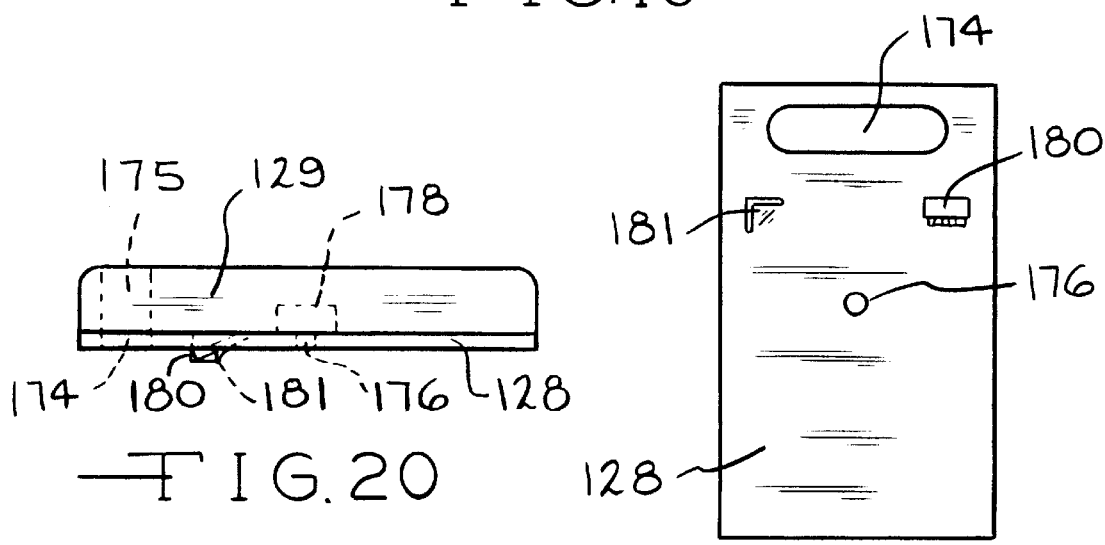
FIG. 20
FIG. 21

PORTABLE STOOL

This application is a continuation in part of application Ser. No. 08/897,971 filed Jul. 21, 1997.

BACKGROUND

The invention relates to a compact portable seat or stool that can be easily carried and set up against a tree, post, wall, etc. The invention is particularly useful for hunters, bird watchers, golf watchers, event watchers, etc.

Portable seats or stools are well known and there are a variety available, but all have disadvantages or shortcomings. It is desirable that the seat provide a back rest because that is more restful. However, portable seats having a backrest light enough to carry substantial distances, such as aluminum lawn chairs or beach chairs, are too bulky and cumbersome, particularly if other things are also being carried, like a gun for hunting, a large umbrella, a cooler, etc.

Portable seats for attaching to trees or posts such that the tree or post can be used as a backrest are known. U.S. Pat. No. 5,327,994 discloses three such portable seats or stools. The first consists of a flat member for resting against a tree or post and having a chain that can go around the tree and attach to each side of the top of the flat member to hold it against the tree. A second flat seat member is pivoted at one end to the top of the first flat member. The second flat member has a third flat member support pivotly mounted about midway to the underneath side of the second flat member. When the second flat member or seat is pivoted out to form a generally horizontal seat, the third member forms a support between the first and second members to hold the seat in place. This seat is compact but has several disadvantages. It cannot be used against a flat wall because there would be no way to hold it on the wall and it cannot be attached to a large tree or large post without the help of a second person, and even then would require a long chain which would be a nuisance. Also, since the first member is flat, it would tend to twist on a round tree since it would be resting on a crowned ridge instead of a flat surface.

The second portable seat disclosed is also disclosed in a separate patent which will be discussed below. The third portable seat comprises a flat member with a clawed V-shaped arrangement on each end with straps at each end for wrapping around a tree or post to secure the seat against the tree or post. A seat, pivotly attached at one end to the flat member, can be raised to form a generally horizontal seat and folding supports, like those used on card table legs, hold the seat in place. This seat suffers the same shortcomings as the first seat discussed above and one more. One end of this seat system is supported on the ground or on tree roots with two V-shaped legs, but at a spot very close to the trunk of the tree. On many trees a person would like to sit against, the tree base would taper out such that it would appear to preclude the safe use of this seat.

The second seat shown in the above patent is described in detail in U.S. Pat. No. 4,600,081. This portable seat attempts to address the problem of instability by the use of a cradle like frame to rest against a tree. The frame is held to the tree with a chain passing around the tree and thus suffers the shortcomings of not being useful against a wall or convenient for use on a large tree or large post.

Another portable seat is shown in U.S. Pat. No. 4,705,143 and consists of a fabric seat having a rope attached along one side and two legs attached at the corners of an opposite side. The rope must be tied around a tree or post giving this seat the disadvantages mentioned above. In addition, it appears that it could not be used with a small tree or post, i. e. one about 6–8 inches in diameter, and a person's weight would tend to form a sling seat that would be harder to get out of quickly compared to a flat seat. Another sling seat illustrated in U.S. Design Pat. No. 320,460 suffers similar shortcomings.

There is also one or more portable seats that screw into a tree or post, but the disadvantages of this seat in the time and difficulty required to attach and to remove the seat are obvious. Also, there would be times when it would be undesirable to deface a tree, etc. with one or more screws.

Another portable hunting seat is disclosed in U.S. Pat. No. 5,287,643. This seat is supported only by the ground on four legs and has the distinct disadvantage of needing fairly level and even ground surface to be stable and useful as intended.

A portable stool is needed that is compact, lightweight, safe, sturdy, and can be easily and quickly set up by one person against a generally vertical surface such as a wall, post, tree, etc., and which can be used on uneven or slanted ground and will allow the user to use the generally vertical surface as a backrest and then can be easily removed and broken or folded down to a compact mode for carrying and storage. The seat should also allow the user to quickly stand up, and preferably to pivot around from side to side while sitting when desired.

BRIEF SUMMARY OF THE INVENTION

The invention is a compact, lightweight, easy to carry, portable, sturdy, stable, stool or seat that, from a compact mode, easily fits together or folds out for use by propping one end of a secondary support member against a generally vertical surface like a tree, post, wall, fence, light pole, etc., and setting one end of a, generally vertical, primary support member on the ground or other generally horizontal support surface. When the word "ground" is used herein, it is meant to mean any earthen surface, such as one would encounter in a forest, golf course, pasture, park, etc. and also includes concrete, asphalt, wood, rock or other surfacing material. Preferably, the stool can also be easily adjusted for sitting height. After use, the inventive stool can be quickly and easily taken apart and/or folded down into a compact mode for easy storage and/or carrying.

The portable stool comprises a primary support member, a secondary support member and a seat. The seat can be easily removable for folding or otherwise converting into a compact mode, or the seat can remain attached while folding or converting to a compact mode, but the seat is located such that the major portion of the weight of a person sitting on the seat is supported by the primary support member. Preferably only one support member, the primary support, contacts the ground. The secondary support member can be rigidly and/or pivotly attached at one end to the primary support member, preferably with one or more pins or one or more hinges that allow the secondary support member to rotate or pivot on the primary support for folding down, and has a generally forked, U shaped or V-shaped, member at the other end for gripping an existing structure like a tree, fence, wall, etc.

The portable stool comprises first means for supporting a major portion of a persons weight in the generally vertical vector by contacting the ground at a single spot, a second means for supporting a minor portion of a persons weight in the generally horizontal vector by contacting a generally vertical structure, and a means attached to either the first means or the second means for supporting a person, but supported mainly by the first means when in a use mode, the second means being attached to the first means in a rigid way in the use mode and pivotly connected, or not connected at all, to the first means when in a compact mode.

On some embodiments of the invention, the primary support member has a removable and/or rotatable seat at one end, preferably a provision for attaching the seat somewhere along the length of the primary support member while in a compact mode for carrying and storage, and a ground contact surface at its other end. The primary support can optionally be adjustable in length. When the portable stool is in a compact mode for transport or storage, the secondary support member is generally parallel with, preferably partially surrounds, or is nested with, contains, or is contained in, the primary support member. Generally parallel means an angle between the two members of less than about 15 degrees, and preferably no more than 5 or 10 degrees from parallel. Other embodiments of the invention have a seat that remains in place, though preferably rotated 90 degrees, in the folded down or compact mode.

One unique thing about the preferred stool is that it has only one support member that touches the ground, the primary support member or the generally vertical means, and this makes it useful on uneven or sloping ground where other portable stools having a support or supports that contact the ground in two or more places are unstable or uncomfortable or both. The primary support member preferably contacts the ground in only one spot or small area, such as an area of less than about 20 square inches and preferably less than about 10 square inches, such as less than about 6 square inches. While other ground contact elements could be added, they are not necessary or desired. For purposes of description of this invention, generally vertical means no more than about 45 degrees, and preferably no more than about 15 or 30 degrees, from true vertical. The primary support member, or first means for support, can optionally be adjustable in length to enable seat height to be easily adjusted to fit the users needs.

The secondary support member, or second means for support, has two or more spaced apart, dull pointed or sharp pointed projections or extremities on one end for contact or engagement with a generally vertical surface, or with a sloping surface, in a non-slipping way. This invention needs only a generally vertical element or structure like a tree, post, fence or wall to support the secondary support member, which is usually more horizontal than vertical when in the use mode, i. e. is generally horizontal being not more than 45 degrees, and usually less than about 45 degrees off of horizontal such as less than about 30 degrees, preferably less than about 15 degrees. While the secondary support member can support a minor portion of the weight of a person sitting on the stool, its main function is to stabilize the stool or seat. The secondary support member, along with at least one of the user's legs and feet, provide excellent stability for the stool while in use.

Optionally, the seat of the stool is removable and/or rotatable and is preferably covered with a padding material and a waterproof membrane like vinyl. The seat support can be on the primary support member or the secondary support member. The seat support can be a tube mounted perpendicularly on top of the vertical portion of the primary support member, preferably with a removable cap or insert on one or both ends making the seat support also a storage container for matches, skin lotion and other useful items. The seat holder can also be fixed to the secondary support member, or second means for support, but when in use is supported mainly be the primary support member, or first support mean. Also optionally, the primary support member can have one or more projections to use with a rope or chain as a handle to drag a deer or other heavy game or other objects. Preferably, the stool has a loop attached near one end to put over a shoulder to facilitate carrying the portable stool under one's arm where it is out of the way, freeing both arms for other things like holding a rifle and shooting or carrying other things.

The gripper on the secondary support member can be any of various shapes and construction for contacting a generally vertical surface of a structure in a non-sliding manner, can be adjustable and can be shaped for both flat or rounded surfaces. The gripper can be integral with the rest of the secondary support member or can be a separate part that is attached in a known manner.

The portable stool of the present invention has many advantages that overcome shortcomings of each prior art portable stool or seat. It need not be strapped to a tree or other support surface, it has only one leg that needs to engage the ground or other surface and therefore can be used on uneven and sloping ground. The portable stool is compact, lightweight and convenient to quickly fold up for use and to break or fold down for carrying. It is comfortable, sturdy and stable, and is useful in almost any situation.

BRIEF DESCRIPTION OF THE SEVERAL VIEWS OF THE INVENTION

FIG. 3A is a front view of the primary support of the preferred embodiment stool shown in FIGS. 1 and 2.

FIG. 3B is a side view of the primary support shown in FIG. 3A.

FIG. 3C is a partial back view of the primary support taken along lines 3C—3C in FIG. 3B and shows a slot in the backside of the primary support.

FIG. 4A is a plan view of the secondary support of the stool shown in FIGS. 1 and 2.

FIG. 4B is an end view of the secondary support shown in FIG. 4A.

FIG. 4C is a side view of the secondary support shown in FIG. 4A.

FIG. 5A is a top view of a seat shown in FIGS. 1 and 2.

FIG. 5B is a side view of the seat shown in FIG. 5A.

FIG. 5C is an end view of the seat shown in FIG. 5A.

FIG. 6A is a side view of the stool of FIGS. 1 and 2, but in a folded, compact mode.

FIG. 6B is an end view of the stool shown in FIG. 6A in a folded, compact mode.

FIG. 6C is a plan view of the stool shown in FIG. 6A in a folded, compact mode.

FIG. 6D is an opposite end view, compared to FIG. 6B, of the stool shown in FIG. 6A.

FIG. 7 is a partial side view of other stool embodiments of the present invention including another folding or rotating embodiment and a different extremity configuration for the secondary support member.

FIG. 8 is a plan view of an end portion of the embodiment shown in FIG. 7.

FIG. 9 is a partial side view of still other stool embodiments of the present invention showing still another extremity configuration for the secondary support member and another folding or rotating embodiment.

FIG. 10 is a partial side view of still further embodiments of the stool of the present invention showing another folding or rotating embodiment.

FIG. 14 is a side view of a most preferred embodiment of the present invention folded out and ready to sit on.

FIG. 15 is a front view of a primary support member of the embodiment of FIG. 14.

FIG. 16 is a back view of the primary support member of the embodiment of FIG. 14.

FIG. 17 is a side view of the primary support member of the embodiment of FIG. 14.

FIG. 18 is a side view of a secondary support member of the embodiment of FIG. 14.

FIG. 19 is a top view of the secondary support member of the embodiment shown in FIG. 14.

FIG. 20 is a side view of a seat of the embodiment shown in FIG. 14.

FIG. 21 is a bottom view of the seat of the embodiment shown in FIG. 14.

DETAILED DESCRIPTION OF THE INVENTION

Figure 1:
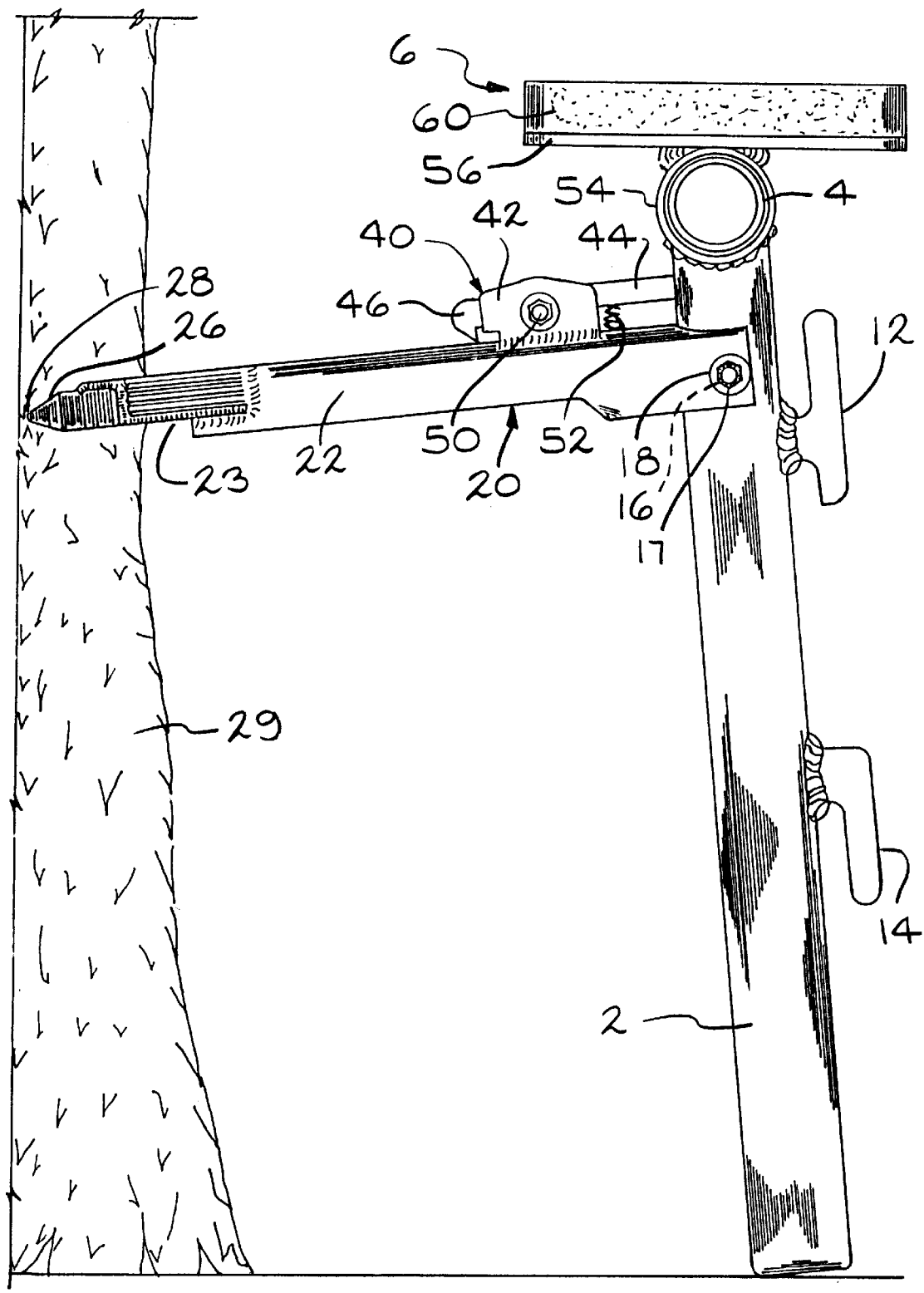
FIG. 1 is a side view of a preferred embodiment of the present invention and shows the preferred portable stool propped against a tree and ready for use.
Figure 2:
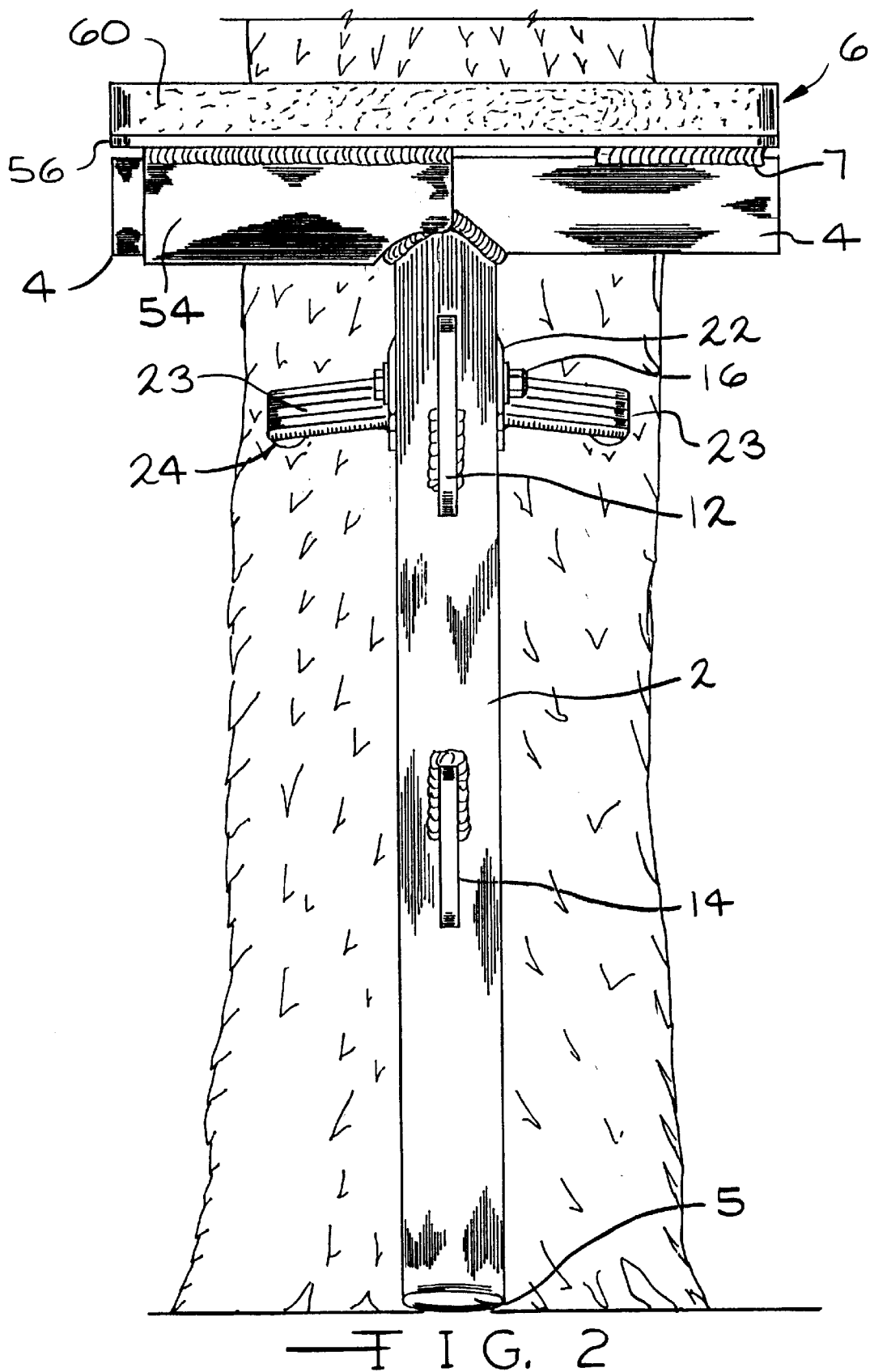
FIG. 2 is a front view of the preferred embodiment shown in FIG. 1.

One preferred embodiment will be described first, and then other embodiments including the most preferred embodiment and other optional features will be described. Referring to FIGS. 1 and 2, the preferred embodiment stool of the present invention is shown in the use mode propped against a tree. This portable seat or stool has a primary support member 2 which is generally vertical in the use mode and can be a pipe, box channel, tube, I beam, or any other structural shape that will preferably hold at least about 300–600 pounds without failing. The primary support member 2 has a cross member 4 mounted at the top end.

The preferred primary support member 2 is shown in detail in FIGS. 3A, 3B and 3C. The primary support 2, is preferably made from a light weight, strong material. The preferred embodiment was made using aluminum pipe having an O. D. of about 1.6 inches and a wall thickness of about 0.109 inch. The primary support 2 has a cross member 4 centered and welded at a top end, but it is not necessary that it be welded or centered, and the cross member 4 is optional. Any suitable attachment means could be used and, even on the preferred embodiment, the cross member 4 need not extend beyond the primary support on both sides, or not as far as shown in FIG. 3A. The cross member 4 can be a pipe, tube, box channel, I-beam, channel or any other shape that will be strong enough to support at least 300–600 pounds. In the preferred embodiment, the cross member 4 is made from the same material as the primary support 2. As will be described later, a cross member is not essential to the invention.

One side of the cross member 4 has an optional seat support plate 7 attached by welding, screws, etc., preferably on the top as shown, and at or near an end of the cross member 4. The purpose of this plate 7 is to support a seat which will be described later. Any projection having sufficient strength could be used instead of the plate 7, such as a weld buildup, screw, pin, washer, etc. welded or otherwise fastened to the cross member 4. The plate 7 is not necessary, but is preferred, and can be replaced with a modification of a seat as will be described later.

As shown in FIG. 3C, the back side of the primary support 2 has a slot 8 passing through the wall of the pipe of the primary support 2. Preferably, the slot is rectangular with the longest dimension being parallel with the axis of the primary support 2 and the slot is on the side of the primary support 2 from which a secondary support 20 extends (see FIG. 1), i. e. such that the axis of the secondary support 20 intersects the longitudinal centerline of an exterior face of the slot 8. The purpose of this slot is to receive a latch, to be described later.

The primary support 2 shown in FIGS. 1 and 2 also has optional cleats 12 and 14 mounted along its length, preferably on the side opposite the side having the slot 8. These cleats, which are preferred, but not necessary to the function of the stool, can be welded, bolted, or screwed into the primary support 2. The cleats 12 and 14 are preferably L or T shaped and are for the purpose of holding a rope, cable or chain so that the stool, in the compact mode (shown in FIGS. 6A–6D), or the primary support 2 with the cross member 4, can be used as a handle to facilitate pulling or dragging something, such as dead game. Two opposed holes 10 are in opposed faces of the primary support 2 near its top, i. e. near the cross member 4, but preferably past the slot 8, from the cross member 4. The axis of the holes 10 preferably intersect the axis of the primary support 2 and are each 90 degrees from a projection of the axis of the rectangular slot 8 parallel to the axis of the primary support 2.

Referring to FIG. 2, a bottom end of the primary support member 2 preferably has an end pad or cap 5 attached by welding or some other known means of attachment such as with threads in a known way. This end pad or cap 5 is not essential, especially where the ground is hard or the stool is to be used on a hard surface. The end pad or cap 5 prevents the primary support from sinking into soft ground. Another way of providing for the end pad or cap 5, especially when the primary support 2 is made from pipe or tubing, is to press or thread an end cap or plug onto or in the end of the primary support member 2.

Again referring to FIG. 1, the secondary support 20 having an arm 22 with a forked end or gripper 23 on an end 36, is rotatably or pivotly attached at very near the other end of the arm 22 to the primary support 2 with a pin, rivet(s), or bolt 16 passing through the holes 10 in the primary support 2 and holes 21 in the secondary support 20. A nut 17 on the threaded bolt 16 secures the bolt 16 in place. At least one washer 18 is optional, but is preferred when a bolt and nut are used.

As also shown in FIGS. 4A–4c, the gripper 23 is preferably U shaped, but it can also be V shaped, crescent shaped, or any shape that spaces at least two gripping members, such as rods 24 having a tapered section 26 near its extremity ending in a dull point 28. The dull points 28 are safe for handling and bite into the generally vertical surface they are against preventing the gripper from sliding along the surface. Since it is often desirable to place the gripper in contact with a tree or round post, it is preferable that the gripper be curved to fit around a tree or post having a diameter smaller than the distance between the insides of the rods 24 or tapered sections 26, and to provide clearance for the exterior of a larger tree or post as shown in FIG. 1 where the portable stool rests against a tree 29. The rod or rods 24 are optional since pointed extremities 30 of legs 32 of the gripper 23 could serve the same function as rods 24 and dull points 28.

The legs 32 were made by welding a short piece of angle onto one end of each side 34 of an arm 22 of the secondary support 20. A portion of the top of each angle making the legs 32 was rolled over as shown to form the legs 32. A short section of slightly curved rod 28 was then welded to each of legs 32 as shown in FIG. 4C. As shown in FIG. 4A, a portion of the top 25 of the channel on the opposite end of the arm 22 has been cut out to form curved edge 38 so that the arm 22 can fit around the primary support 2. In the embodiment shown, the arm 22 is made from an aluminum C channel, but the arm 22 can be made from other structural shapes like an angle, box channel, I beam, tubing, etc.

The gripper 23 can have teeth or dull points made in various ways on the inner surface of the U or V shape, or this inner surface could be covered with a gripping material like an elastomer or rubber. The U or V shaped fork gripper could be made in two or more pieces so the angle formed by the legs 32 is adjustable, or the legs 32 could pivot on the arm 22 and be spring loaded to allow the legs 32 to open up to a greater angle.

A latch mechanism is required to hold the secondary support member 20 in a rigid relationship with the primary support member 2 when the portable stool of the present invention is in the use mode. In the preferred embodiment, a latch mechanism 40 is mounted on the top 25 of the secondary support member 20 and comprises a clevis or brackets 42 attached to the top 25 of the secondary support 20 by any suitable means, such as by welding, a catch bar or bar 44 having hooks 46 and 48 (hidden), one on each end, or being L shaped on each end. Preferably, the hook 48, or base of the L, on the end of the bar 44 nearest the mounting pin 16 leads away from the top 25 of the arm 22 of the secondary support 20; and the hook 46, or base of the L, on the opposite end of the bar 44, and furthest from the pin 16, leads towards the top 25 of the arm 22.

The bar 44 is pivotly or rotatably mounted along its length between the two hooks 46 and 48 in the clevis or bracket 42 with a bar mounting pin 50, such as a threaded bolt and nut, but a cotter pin or one or two rivets or other kinds of pins can be used instead. The pin 50 passes through holes 51 in the sides 34 of the channel used to make the arm 22 of the secondary support 20 near the end of the arm 22 opposite the gripper 23 and at a height up the side 34 of the channel a sufficient distance to allow the channel to fold down and nest around the primary support 2, as shown in FIG. 6A. Preferably, the end of the hook 48 is curved as shown in FIG. 4C such that when it engages one or more edges of slot 8, the hook 48 will be pushed in a circumferential direction with respect to the axis of the bar mounting pin 50.

The bar 44 is biased, preferably with a spring 52 such that the hook 46 is forced towards or against the top 25 of the arm 22 and the hook 48 is forced away from the top 25. While the spring 52 shown is a compression spring, any means of biasing in this manner can be used, such as any compressible, elastomeric material, a flat =coil spring, leaf spring, etc. The purpose for this shape of hooks and the biasing will become apparent later in the description.

Referring to FIGS. 1 and 2 again, a seat 6 is mounted above the primary support 2, preferably by mounting the seat 6 on the cross member 4. The seat 6 includes a seat plate 56 that is preferably generally flat and generally rigid, but a contoured seat plate could also be used. The seat plate 56 should have a length and width large enough to provide a relatively comfortable stool and the dimension from side to side will usually be larger than the front to back dimension. The seat plate 56 does not have to be rectangular, but can be round, oval or any other functional shape. The thickness of the seat plate will vary depending upon the material it is made of, but only need be as thick as necessary to provide the rigidity and strength required.

In the preferred embodiment, shown also in FIGS. 5A–5C, the seat plate 56 has a short section of pipe attached to one large face along the front to back centerline of the seat plate 56 forming a slide mount 54. Preferably the slide mount 54 is attached by a weld, but screws or any other attaching means can be used. Preferably, the I. D. of the pipe used to make the slide mount 54 is slightly larger than the O. D. of the cross member 4, such as about one and eleven-sixteenths inches. A portion of the pipe of the slide mount 54 is cut away, as shown in FIG. 5B, to form curved surface 58 which will fit over the primary support 2 when the slide mount 54 is slid over the cross member 4 as shown in FIG. 2. Providing for one end of the slide mount 54 to fit around the primary support 2 prevents the seat from tilting backwards or forwards when the seat 6 is mounted on the primary support 2, and used.

The slide mount 54 can be much shorter than shown, and could simply be a ring when the seat mounts on the top end of the primary support member 2 not having a cross member 4. Also, the ring could be located to fit around one of the extremities of the gripper 23 on the secondary support member 20 when in the compact mode instead of around the primary support member 2. The plate 7, or its equivalent, on the opposite portion of the cross member 4 also supports the seat plate 56, but the plate 7 could be eliminated by adding a projection on the underside of the seat plate 56 in a position to contact the top of cross member 4 when the seat 6 is in place in the use mode.

Preferably, the seat plate 56 is covered with a compressible layer 60 such as a closed cell dense foam that is both comfortable to sit on and that will not absorb water, etc. Preferably the seat plate 56 and layer 60 have an aligned square or rectangular slot 62 through both for engaging hook 46 when in a compact mode as will be described later. The layer 60 can also be covered if desired with a decorative and/or functional cover such as cloth, vinyl or other material, including printed advertising on the cover. The layer 60 also has an inset 64 adjacent to the slot 62 where there is no compressible material to allow one end of the brackets 42 to enter when the portable stool is in the compact mode shown in FIG. 6C.

Except for the compressible layer 60 and the spring 52, all of the remainder of the parts are preferably made of aluminum to reduce weight to below five pounds. Other materials can be used instead of aluminum such as wood, plastic, reinforced plastic, steel, other light weight materials and combinations of these materials.

The portable stool of the present invention is lightweight, easy to carry, easy to set up into a use mode, comfortable, very versatile, stable, safe and easy to convert to a very compact storage and carrying mode. FIGS. 1 and 2 show the stool set up for a use mode. Having only one ground contact support, primary support 2, the stool can be used on trees where extensive exposed roots and uneven ground level would make conventional ground contacting stools or seats impractical. Referring to FIG. 1, a person can sit on the seat 6, with feet spread for added stability and lean back against the tree 29 producing a comfortable, stable arrangement.

It takes less than a minute to convert the stool from a compact mode to a use mode and the same for reversing this process. FIGS. 6A–6D shows the preferred embodiment in a compact mode. Referring also to FIG. 1, converting the preferred stool from a use mode to this compact mode requires only a few simple steps. First, the catch bar 44 is depressed towards the top 25 of the arm 22 moving the hook 48 into a disengaging and unlocking position and the secondary support 20 is pivoted or rotated towards the primary support 2 until the latter nests inside the channel forming the arm 22 as shown in FIG. 6A. Next, the seat 6 is removed from the cross member 4 by sliding the slide mount 54 off the cross member 4.

Finally, the seat, with the compressible layer 60 up, is slid along the top 25 of the arm 22 such that slide mount 54 slides over the ground contacting end of the primary support 2 and until the hook 46 latches into the slot 62 in the seat plate 60, as shown in the FIGS. 6A and 6C. The outer curvature of the hook 46, as shown in FIG. 4C, is such that when the leading edge of the seat plate 62 contacts the hook 46 in a sliding manner, the hook 46 will be raised up allowing the plate 62 to slide under the extremity of the hook 46 until the extremity of the hook 46 is over the slot 62, at which time the spring 52 biasing the hook 46 will cause it to slide into the slot 62 securing or locking the seat 6 into place on the secondary support 20. The stool is now in a very compact configuration which can, with the aid of a rope sling for over the shoulder or other known means, can be tied to a back pack, carried under one's arm, etc. leaving the hands and arms free to carry other things like an umbrella or a weapon.

When one desires to set the stool up into a use mode as shown in FIGS. 1 and 2, the above described process is merely reversed, the outer shape of hook 48 being such that as the secondary support 20 is rotated away from the primary support 2 around pin 16, the outer curvature of the hook 48 will engage the top edge of the slot 8 causing the hook 48 to move towards the top 25 of the arm 22 and compressing the spring 52. Once the extremity of the hook 48 clears the inside top edge of the slot 8, the compressed spring 52 will return the hook 48 to a locking or securing position preventing the secondary support from moving back down until the bar 44 is depressed. The curved edge 38 of the arm 22 prevents the secondary support 20 from rotating much further upwardly around the pin 16, producing a locked, generally rigid connection or attachment between the primary support 2 and the secondary support 20 in the use mode, but one that can be unlocked and made foldable or non-rigid very easily.

While the preferred embodiment and variations thereof have been disclosed above, there are many variations of the present invention too numerous to disclose here as will be recognized by those skilled in the art once seeing and studying this disclosure. A few examples are shown and described below to illustrate the breadth of the invention.

FIG. 7 shows a different locking mechanism for the secondary support 20 and also, along with FIG. 8, a different type of gripper. In this embodiment the secondary support 20 is rotatably mounted onto the primary support 2 with the mounting pin 16 in the same manner as the preferred embodiment, but the locking mechanism is different. In this embodiment a first support pin 70 passes through the primary support 2 below the pin 16 a few inches towards the pad 5 end of the primary support 2. Also, a second support pin 72 passes through a channel that is an arm 71 of the secondary support 20. The pins 70 and 71 can be of several types such as described for the mounting pin 16 and the bar mounting pin 50. Mounted to the first and second support pins 70 and 72 is locking and folding mechanism 74. This type of locking and folding mechanism is well know as various embodiments are used on card table legs and numerous other types of tables, folding shelves, etc. This type of locking mechanism 74 usually has first and second support bars 76 and 78, usually made of steel. One end of the first support bar 76 is rotatably attached to the arm 22 by the second support pin passing through a hole in the end portion of the said bar 76 and the other end of said bar 76 is rotatably attached to one end of the second support bar 78 with a rivet 80. The other end of the second support bar 78 passes through an elongated slot (not shown) in the primary support member 2 and is attached to the primary support member 2 by the first support pin 70 running through a hole in the end portion of the second support bar 78. The elongated slot (not shown) is wide enough and long enough to allow at least a portion of the locking and folding mechanism 74 to enter when the secondary support 20 is folded down around the primary support 2 into the compact mode. This type of locking and folding mechanism 74, which is readily available in many embodiments, is designed such that when it is folded out into the position shown in FIG. 7, it will lock and not refold back until the area where the two support bars 76 and 78 join is pushed towards the intersection between the primary support 2 and the secondary support 20.

Another embodiment of this type of folding and locking mechanism has only one bar having a slot therein ending in a hole with a diameter larger than the width of the slot. One end of this type of support bar would be attached to the outside of arm 71 and to a pin having two different diameters on the outside of the primary support 2 in a known manner. Such a folding and locking mechanism could be used on one or both sides of the arm 71. Using this type of a folding and locking mechanism would eliminate the need for an elongated slot in the primary support 2.

Referring to the other end of FIG. 7 and to FIG. 8, other types of gripper configurations can be used. In the embodiment of these figures, the gripper is a bent rod 82 having two ends, each ending in a dull point 84. The bent rod 82 passes through aligned holes 86 in the sides of the arm 71. The bent rod 82 can be tack welded in a rigid position, or it can rotate downward and into a nesting relationship with the arm 71 for converting to a compact mode. In the latter embodiment, a stop 88 is welded to the bent rod 82 near its center between the sides of the arm 71 which allows, when the bent rod 82 is rotated into the use mode, the dull points 84 to be above the axis of the holes 86 in the sides of the arm 71, but prevents the bent rod 82 from rotating any further due to the stop 88 contacting the underneath side of the arm 71. When placed against a tree or post, etc. in this position, the bent rod 82 is locked into the position shown in FIG. 7. It is also possible to eliminate arm 22 by locating the bent rod 82 gripper through holes in the primary support 2 and making two fingers of the bent rod 82 gripper a lot longer than shown in FIG. 8. In such an embodiment the bent rod 82 gripper would have a stop 88 appropriately placed to limit the upward rotation of the dull points 84 of the bent rod 82, as shown in FIG. 7, but in this embodiment the stop 88 would contact the inside of the primary support 2 to stop the bent rod 82 in the correct use position.

A simpler modification of the use of a bent rod gripper is illustrated in FIG. 9 where a bent rod 82 gripper is welded to the top of an arm 90 of the secondary support 20. Instead of a bent rod, a piece of metal in the general form of a crescent moon can be used instead.

Another folding and locking embodiment for the secondary support 20 is illustrated in FIG. 9. In this embodiment an arm 90 of the secondary support 20 is attached to the primary support 2 with mounting pin 16 and the curved edge 38 just like the preferred embodiment, but in this embodiment the locking or latching mechanism is different. In this embodiment, one or more locking holes 92 are in one or both sides of the arm 90 spaced about one-half inch from the pin 16 and with their centerline being a radius with the center of pin 16. Only one latching hole 94 is placed in either one or both sides of the primary support member 2. The latching hole 94 is placed to align with one of the locking holes 92 as the arm 90 is rotated into a use position. The use of more than one latching hole 92 allows versatility in the angle of the secondary support member in the use position. When the arm 90 is in the desired use position, a locking pin 96 is passed through the locking hole 92 aligned with the latching hole 94; and if there are holes in both sides of the arm 90 and both sides of the primary support 2, the locking pin 96 is long enough to pass through all aligned holes. The locking pin 96 is a well known item and can have a folding ring on one end as shown which can, if desired, be attached to the arm 90, etc. with a chain, etc., as shown in FIG. 12, so it is always handy and doesn't get lost.

Figure 11:
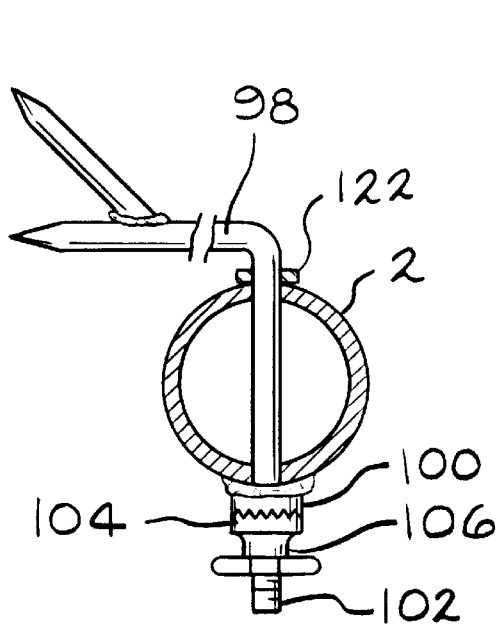
FIG. 11 is a partial cross section along lines 11-11 of FIG. 10 showing a locking mechanism for a folding or rotating secondary support.

FIGS. 10 and 11 illustrate a still further variation of a folding and locking mechanism for the secondary support and also a different embodiment of a secondary support. These figures show a support rod 98 bent on one end to form an L which passes through the holes 10 in the primary support member 2. A flange 122 is welded onto the rod 98 to contact the primary support member 2. Aligned with, and welded to the outside of one of the holes 10 is a toothed washer 100. The end portion 102 of the portion of the support rod 98 that passes through the primary support member is threaded and a second, loose toothed washer 104 is placed on the rod 98 in an engaging position with the toothed washer 100. A threaded knob 106 is turned onto the threaded portion 102 of the support rod 98 and, when the latter is in the desired position, the knob 106 is turned further to frictionally engage a smooth side of the loose toothed washer 106 to push the teeth of this washer into a meshing engagement with the teeth of the fixed toothed washer 100 and further turned tight in a known manner, with the benefit of the flange 122, to lock the support arm 98 in the desired position. When it is desired to unlock the arm 98 for rotating to another position the knob 106 is loosened and the loose washer 104 is pulled out of engagement with the fixed washer 100, again in a known manner.

A gripper, such as the bent rod 82 gripper described earlier can be attached to the other end of the support rod 98 in any known manner such as welding. The support rod 98 can be of an obvious shape to optimize folding into a compact mode.

Figure 12:
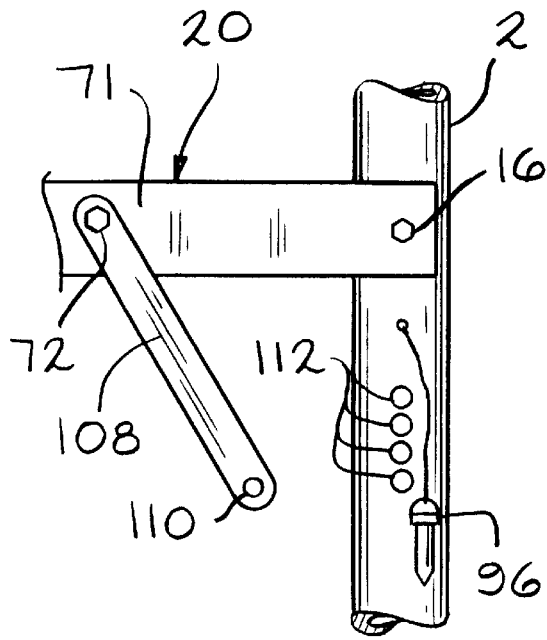
FIG. 12 is a partial side view of still another embodiment of tool of the present invention showing a different way of supporting and locking the secondary support member in place for a use mode.

FIG. 12 shows a folding and locking mechanism for the secondary support 20 similar to the embodiment of FIG. 7, but in this embodiment a single support strut 108 is attached at one end portion to the arm 71 with the second support pin 72. The arm 71 of the secondary support 20 is rotatably attached to the primary support 2 with the mounting pin 16 in the same manner as before described, and the primary support member 2 has an elongated slot (not shown) in the side facing the support strut 108 that is wide enough to allow strut 108 to easily pass through. The other end portion of the support strut 108 has a strut hole 110 spaced a short distance from the end of strut 108. There is at least one set of locking holes 112 appropriately placed on one side of the primary support 2 as shown (a second aligned set of holes can be on the opposite side of the primary support 2 if desired). When the arm 71 is in the desired use position, the support strut 108 is moved into the slot (not shown) in the primary support 2 such that strut hole 110 aligns with one of the locking holes 112, and a locking pin 96 is placed through the holes 112 and 110 to lock the secondary support 20 into a use mode. The pin 96 is removed to fold the secondary support into a compact mode.

Figure 13:
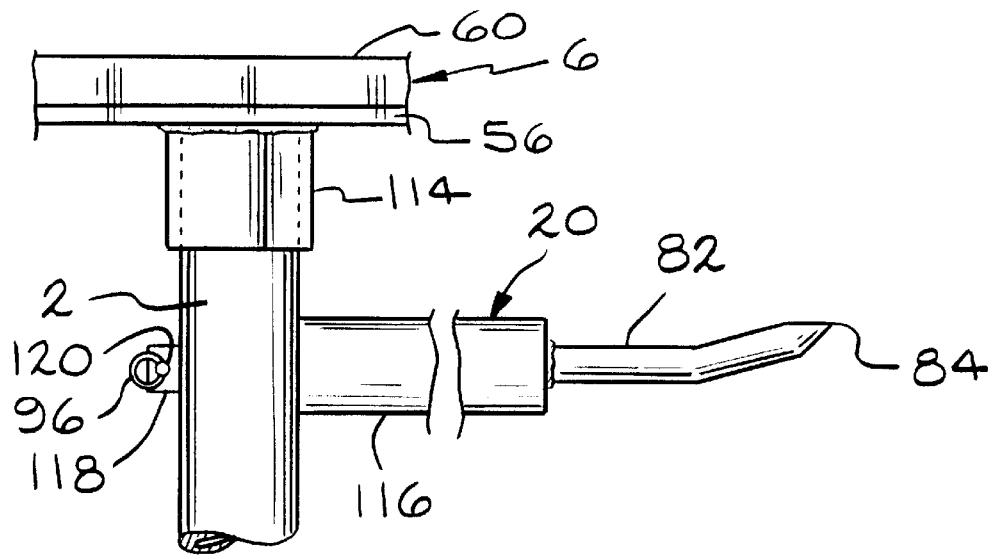
FIG. 13 is a partial side view of still further embodiments of a stool of the present invention showing a removable secondary support member, a pin for keeping the secondary support member in place in the use mode and a different configuration for the gripping extremity of the secondary support member.

FIG. 13 shows an embodiment of the present invention that is different in more than one way from the previous embodiments. In this embodiment the seat 6 sets, either rigidly or rotatably, on the top end of the primary support 2. Attached to the bottom side of the seat plate 56, instead of the slide mount 54, and centered around the center point of the seat plate 56 is a short pipe section 114 having an I. D. slightly larger than the O. D. of the primary support 2. This allows the seat 6 to rotate on the primary support 2, which can be advantageous for looking or shooting to the extreme sides as one sits on the stool of the invention. The short pipe section 114 can be welded to the seat plate 56 or attached by any known means.

The same concept can be achieved by using, instead of the short, pipe section 114, a pipe cap large enough to fit over the primary support 2 or a short pipe section or short shaft section having an O. D. slightly smaller than the I. D. of the primary support 2. In the latter cases, the short sections attached to the seat plate 56 would fit inside the pipe forming the primary support 2. When this modification to the seat 6 is made with the preferred embodiment described earlier, the seat plate would have the slot 62 and the compressible layer 60 would have the inset 64 for attaching to the hook 46 as shown in FIGS. 5A and 6C. In this latter embodiment a very short slide mount, such as a ring, could be attached to the underside of the seat plate 56 for securing to the primary support 2 when in the compact mode. If a tee bar handle, like the cross member 4 in the preferred embodiment, is desired, this can be provided in this embodiment with a couple of aligned holes in the primary support 2 near its top end and a bar to slip through the holes. This bar could be carried inside the hollow primary support when not used as a tee handle. These same holes could also be used for placing a rope through to form a rope sling for carrying.

Referring to FIG. 13, the secondary support 20 shown in this embodiment is different than in previous embodiments in that it is removable for converting to a compact mode instead of foldable. This secondary support 20 includes a bar arm 116 having on one end a lesser height section 118. The lesser height section 118 is long enough to extend through a slot (not shown) in the primary support member 2, which slot is slightly larger than the cross section of the lesser height section 118, and beyond said primary support 2 far enough that the locking pin 96 (see FIG. 9) can be placed in a hole 120 through the lesser height section 118. The locking pin can be attached to the primary support 2 as shown in FIG. 12 if desired. To the other end of the bar arm 116 is attached a gripper such as the bent rod 82 or equivalent. The bent rod 82 gripper shown in this figure is also bent upward slightly on the end portions—it could be straight or bent downward slightly. This manner of attaching this type of secondary support 20 to the primary support is very simple and inexpensive, but is more difficult to secure, and less convenient, when in a compact mode.

Figure 14:
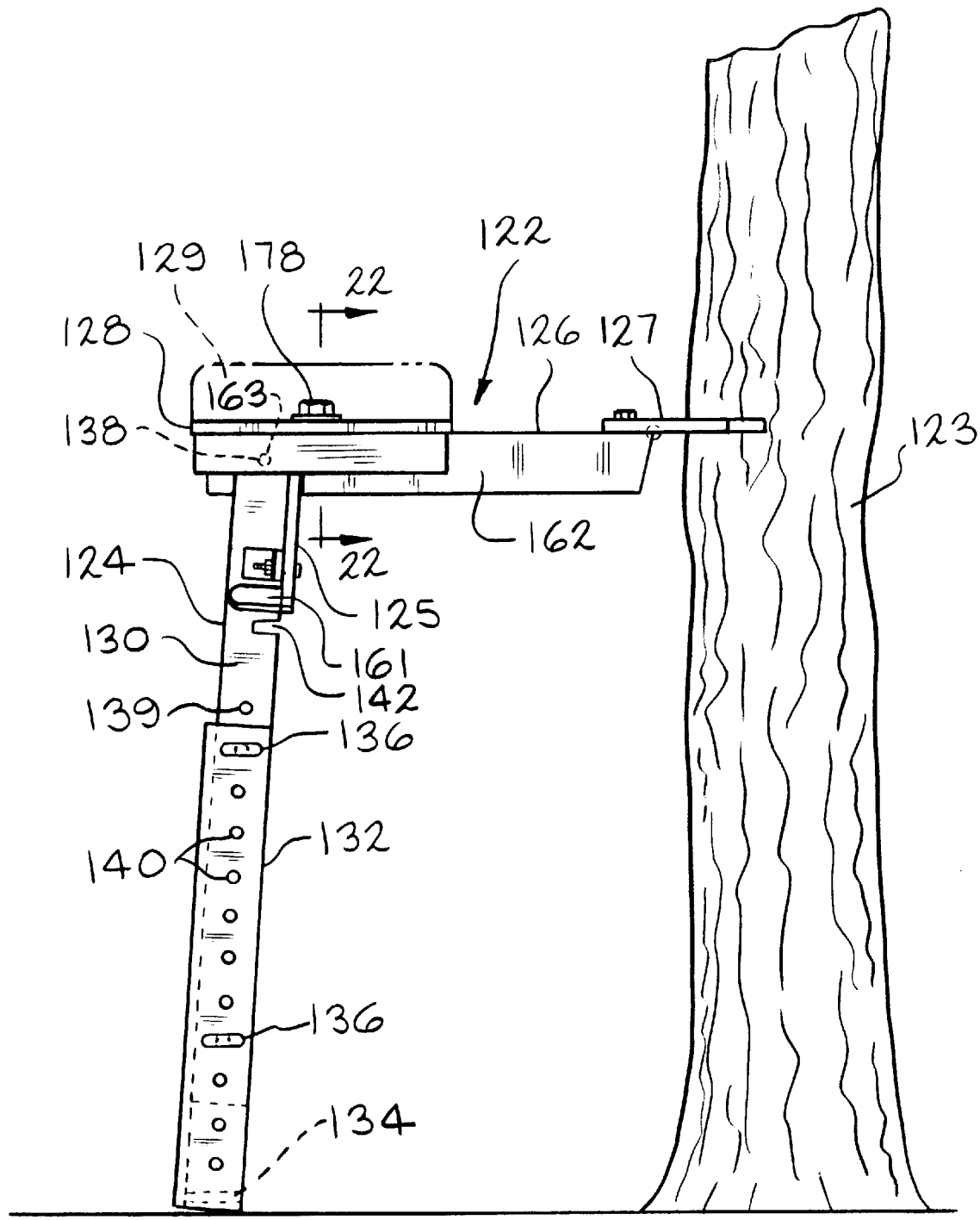

FIG. 14 shows a most preferred embodiment of the invention. This embodiment shows one way a primary support member can be made to be adjustable in length to accommodate different sized people, different terrain and different desired seat heights. Naturally, the secondary support could also be made to be adjustable in length if desired. This embodiment also shows how the seat can be mounted on the secondary support member, but located such that in the use mode the major portion of the weight of a person sitting on the stool is supported by the primary support member. This embodiment also shows how a seat can be made to remain attached when the stool is converted back and forth from a compact mode to a use mode, etc. and also shows a different type of locking mechanism that locks the secondary support member into a fixed position with respect to the primary support member when the stool is in both the use mode or the compact mode. This embodiment also shows a different kind of gripper, one that is flexible and adaptable to different sizes of posts or trees, etc. while still being able to be used against a generally flat surface like a wall.

In FIG. 14 the inventive stool 122, shown in side view in a ready-for-use mode, is supported by the ground and a generally vertical existing structure or object, such as a tree 123. The stool is comprised of a generally vertical, primary support member 124, a generally horizontal, secondary support member 126, and a seat plate 128 having an optional seat pad 129, preferably displaying a cushioning character like a closed cell foam pad or other commonly used seat pad material or construction known to the art.

Referring to FIGS. 15–17, the primary support member 124 has several parts. An upper support 130, in this instance a C channel having a flange on each side of a face 144, optionally with holes or slots 139 spaced along each flange of the channel. The holes could instead, or also, be placed in the face 144. These holes 139 serve one or two purposes, first to lighten the weight and second to cooperate with an optional primary support extension 132, also having holes or slots 140 with the same spacing and, when for the second purpose, positioned to align with the holes in the upper support 130 to allow adjustment of the length of the primary support member 124 using securing pins 136. Although not shown, the primary support member 124 can have projections thereon such as elements 12 and 14 in FIG. 1 for use in coiling or attaching a rope, wire or cable and for pulling or draging a heavy object using the stool as a handle.

The securing pins 136 can be of various types known for this purpose, but preferably are long enough to extend through the primary support extension 132 while leaving a tee or ring handle in a convenient position. Preferably the securing pins 136 have a known means for holding the pins in place while allowing them to be easily removed when desired to adjust the length. The primary support extension 132 optionally has a butt plate 134 fixed to the end that contacts the ground to keep the primary support extension 132 from sinking into soft soil.

The stool 122 can be made from light weight materials, preferably aluminum, wood, or plastic such as PVC, polypropylene, fiber glass reinforced plastic polyester, etc. While the primary support extension 132 and upper support 130 are shown here in the form of a C channel, other structural shapes could be used instead, such as an I beam, a pipe, a rod, a box channel, an arc, etc.

The face 144 of the top end of the upper support 130 is cut out as shown at 146 forming a surface or stop 148 for contacting the under side of an end portion of a frame 162 of the secondary support member 126. The back side of the upper support 130 has at least one notch 142, in this embodiment in each of the flanges of the C channel, to allow the secondary support member 126 to fold down compactly for transport and storage as will be described later. Each of the flanges of the C channel of the upper support 130 has a hole 138 with a common axis for attaching the secondary support member 126.

The upper support 130 has a locking mechanism 125 attached near the top end. The locking mechanism 125 shown includes a bracket 153 attached to a side of the upper support 130 below the stop 148 by any known method such as welding, adhering or with a pins or bolts. Attached to the bracket 153 in a pivoting or rotating way with a pin or bolt and nut 154 is a lock lever 151 having on one end a thumb or finger pad 161 and on the other end an engaging or locking cam 159. A compression lock spring 157, with one end extending into a depression (not shown) on the flange of the upper support 130 and the other end extending into a depression (not shown) in the finger or thumb pad 161, keeps the engaging or locking cam 159 biased towards the position shown in FIGS. 15 and 16, which cooperates with a notch 169 (see FIG. 18) in the bottom side of the frame 162 to lock the secondary support member 126 into a use position or mode, and with a notch 187 in the top side of the frame 162 (see FIGS. 18, 19 and 22) to lock the secondary support member 126 in a compact mode.

The locking mechanism 125 automatically locks the secondary support member 126 into a use mode when the secondary support member 126 is folded out or up into a use position, and into a compact mode when the secondary support member 126 is folded down into a compact position, due to the bias of the compression lock spring 157 forcing the locking cam 159 towards a plane parallel with the flanges and passing through the center line of the face 144. When desirable to fold the secondary support member 126 from one mode to a another mode, the finger or thumb pad 161 of the lock lever 151 is moved towards the flange of the upper support 130 to compress the compression lock spring 157 and to withdraw the engaging or locking cam 159 from the notch 169 when in the use mode, or 187 when in the compact mode, which unlocks the secondary support member 126 allowing it to pivot into a different position and mode.

Preferably, the locking mechanism 125 includes a second bracket 152, a second lock lever 150, mounted in the same way as previously described, to the bracket 152 with the lock lever 150 having a thumb or finger pad 160 on one end and an engaging cam 158 on the other end mounted on the outside of the opposite flange as shown in FIGS. 15 and 16. A second compression lock spring 156 is placed in the same manner as previously described for the compression lock spring 157. The preferred locking mechanism 125 provides added safety to the stool and can be unlocked by placing a thumb on one pad 160 and a finger on the other pad 161 and squeezing the two pads towards each other. Other known or obvious locking mechanisms can be used instead of the locking mechanism 125 on this embodiment of the invention as long as the same purpose of locking the stool in a use mode is satisfied.

The secondary support member 126 for the most preferred embodiment of the stool is shown in detail in FIGS. 18 and 19. The secondary support member 126 includes a frame 162 having the notch 169 for cooperation with the locking mechanism 125 for locking in the use position and mode, and optionally a second notch 171 for the optional second locking mechanism 125, as previously described, and also the notch 187, and optionally the notch 188, for cooperating with the locking mechanism 125 for locking in the compact position and mode. The frame 162 can be a C channel or other shape, but preferably it is made from two pieces or strips as shown, held in place with attachments to other pieces as will be described below. This same construction can also be used for the primary support member 124.

One or more holes 166, in alignment, pass entirely through the frame 162 near the seat end and in the proper position for attaching the secondary support member 126 to the primary support member 125 in a pivoting manner with a pin or bolt (not shown) passing through holes 166 and holes 138 in the upper support 130. The hole(s) 166 are placed in the frame 162 such that when the secondary support member 126 is attached to the upper support 130 of the primary support member 124 and folded out into a locked use mode, as shown in FIG. 14, an end portion of the frame 162 will pass into the cut out 146 in the face 144 of the upper support 130 with the bottom of the frame 162 coming to rest on the surface or stop 148 of the upper support 130. As shown in FIG. 14, the end of the frame 162 extends past the face 144 of the upper support 130 a short distance, but this is not necessary. It is only necessary that the bottom of the frame 162 contact a portion of the stop 148, the lower edge of the cutout, to cooperate with the engaging cam 159 and notch 169 to form a lock for the secondary support member 126, locking the latter into the use position or mode with respect to the primary support member 125.

A gripper 127 is attached to the gripper end of the frame 162. Any of the various types of grippers described in this specification, or obvious modifications thereof, can be used. An adaptable type of gripper is shown in FIG. 19. Here two mirror image gripper arms 164 are attached to the top of a gripper mounting plate 182 that is welded or otherwise attached to the gripper end of the frame 162 of the secondary support member 126. Here the gripper mounting plate 182 is shown mounted with its top surface flush with the top of the frame 162, but it can be raised or recessed if desirable. Each of the two gripper arms 164 are pivotly mounted to the gripper mounting plate 182 with a pivot pin 163 in a known manner. The gripper mounting plate 182 is not an essential element as the gripper arms 164 could be pivotly attached directly to the end portion of the frame 162 if desired, but the gripper mounting plate 182 also provides added stability and stiffness to the frame 162 and therefore is preferred. Only one shape of gripper arm 164 need be made for the embodiment illustrated in FIG. 19 because the gripper arm 164 in the right orientation for use on one side of the gripper, when turned over, can be used on the opposite side of the gripper.

Each gripper arm 164 has a flared out end portion 165 which functions to provide support against a flat surface and also functions to force the gripper arms 164 apart when pressed against a curved surface such as a post or tree. The gripper arms are biased towards one another with a tension spring 173 having one end attached to one of the gripper arms 164 near the gripper arm pivot pins 163 with a spring pin 167 and the other end attached to the other gripper arm 164 in the same respective location in the same manner. The inside surface of each gripper arm 164 preferably has small pointed teeth 177 for gripping a rounded surface with help from the force provided by the tension spring 167. The row of small pointed teeth 177 on the inner surface of each gripper arm 164 end on the outer end with the flared out end portion 165 and on the inner end with a large pointed tooth 179 mounted just outboard of the tension spring 173. The large pointed tooth 179 on each gripper arm 164 protects the tension spring 173 against damaging contact with a post or tree.

The gripper 127 shown in FIGS. 14 and 18–19, and obvious modifications thereof or equivalents, could be used on any of the embodiments disclosed in this specification, and any of the grippers disclosed herein, and obvious modifications thereof or equivalents, could be used on this preferred stool in place of the gripper shown in FIG. 19 and described just above. The gripper might also consist of a strap of rough, flexible material suspended between ends of two widely spaced apart arms having their other ends attached to the frame 162 forming a V like structure with the strap suspended in a curved arc therebetween. In this latter embodiment, the two spaced apart arms would support the stool against a flat surface, and the rough, flexible strap would conform to a curved surface to support the stool.

A seat support 168 is attached to the seat end of the frame 162 by any suitable means, such as welding. The top of the seat frame 168 should be in the same plane as the top of the frame 162. In this embodiment the seat frame is shown as generally square, but it can be any shape and need not have a perimeter band as the seat support 168—it could consist of two or more cross ribs or bars only. A seat mounting plate 170 is attached to the frame 162 such that a hole 172 in the seat mounting plate 170 is generally in the center of the seat support 168. Here the top of the seat mounting plate 170 is shown to be flush with the top of the seat support 168 and the top of the frame 162, but that is not necessary as it can be recessed if desired.

A seat plate 128 is shown in FIGS. 20 and 21. FIG. 21 shows the bottom of the seat plate. The seat plate 128 shown is rectangular, but it can be any desired shape that will function as a comfortable seat. Preferably the seat plate has a cut out 174 near one end that acts as a convenient handle, but a separate handle could be attached to the seat plate 174 or a handle of any kind is not even necessary. The seat plate 174 is shown solid, but it can be a honeycombed, full of holes or other type of lightweight, strong structure. The seat plate 174 has a mounting hole 176, preferably in the center.

The seat plate 174 can be mounted in a known manner to enable a user to rotate the seat while sitting on the stool. In the embodiment shown, the seat plate is fixed in position, especially when someone is sitting on the stool, and rotatable when no one is sitting on the stool and the end having the cutout 174 is lifted and rotated. This is accomplished by attaching one or two seat keepers 180 of various types onto the underneath side of the seat plate 128 as shown in FIGS. 20 and 21. The seat keeper(s) 180 can be any raised structure that will fit into the inside corners of the seat support 168 to keep the seat plate 128 from rotating when the seat plate 128 is pulled or pushed against the seat support 168. As shown in FIG. 21, the seat keeper(s) can be made by welding or otherwise attaching a small block to the back of the seat in the proper position, or by forming a weld bead or inserting a pin, etc., in the proper position.

As shown by FIGS. 20 and 21, another type of seat keeper 180 can be formed by punching or cutting an angled slot 181 into the seat plate 128 and bending down the sheared or cut angle portion of the seat plate adjacent to the slot(s) 181 such that the angled portion protrudes on the back or underneath side of the seat plate 128. Other known or obvious forms of seat keepers will be apparent to those skilled in the art.

Figure 22:
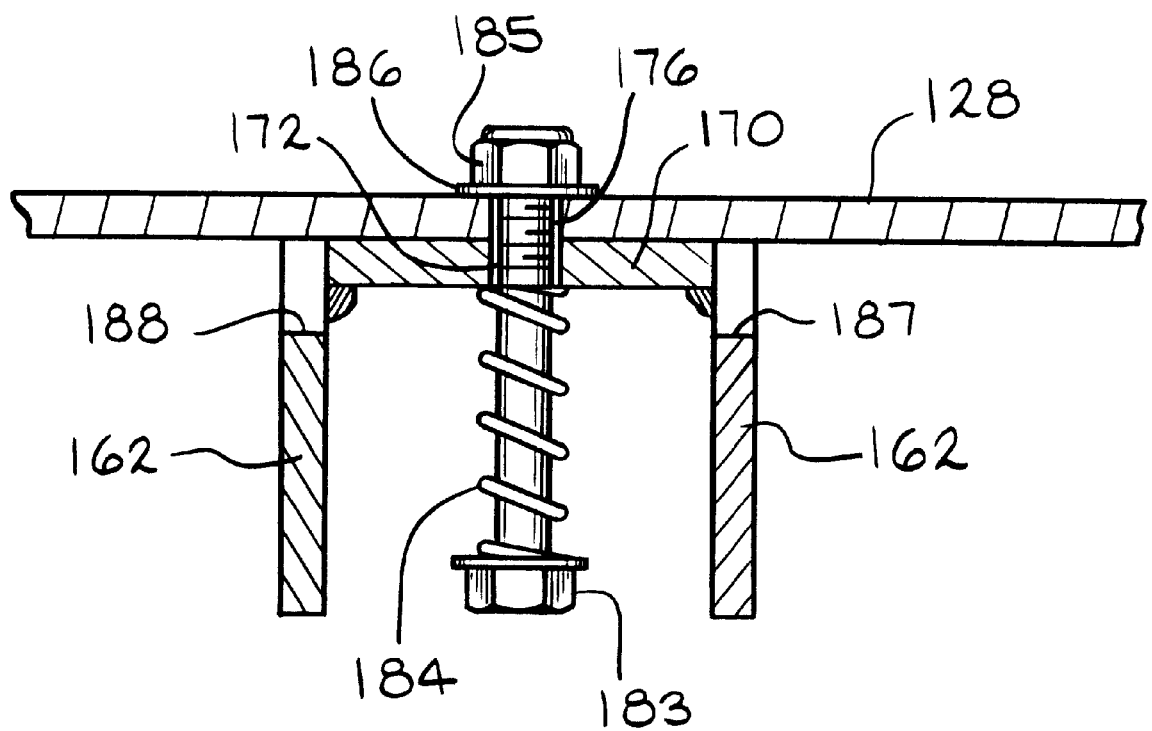
FIG. 22 is cross section through lines 22—22 of FIG. 14 showing a mechanism for attaching a seat, such as the seat of embodiment 14, in a rotatable fashion.

The seat plate 128 is mounted to the secondary support member 126 in a rotatable manner as shown in FIG. 22. The seat plate 128 is placed on the top side of the seat support 168 and frame 162 such that the hole 176 in the seat plate 128 aligns with the hole 172 in the seat mounting plate 170. A seat mounting bolt 183, being substantially longer than the combined thickness of the seat plate 128 and seat mounting plate 170, and having a seat retainer compression spring 184 around its head end portion as shown, is passed through the seat mounting plate 170 and the seat plate 128 and secured with a nut 185, preferably with a toothed lock washer 186, preferably such that the seat retainer compression spring 184 is slightly compressed. The seat plate 128 is thereby held against the seat support 168 by the seat retainer compression spring 184 and prevented from rotating by the contact of the seat keeper(s) against the inside of the seat support 168.

This type of attachment of the seat plate 128 allows the seat plate 128 to be rotated on the seat support to different orientations by lifting the end of the seat plate 128 having one or two seat keepers 180 thereon away from the seat support 168, compressing the seat retainer compression spring 184, and rotating the seat, preferably in 90 degree increments. This allows the cutout handle 174 to be placed in a convenient place for carrying the stool when in a compact mode, and to be rotated for the use mode such that the seat plate is in the most comfortable orientation.

Other known ways of attaching the seat plate 128 can be used without changing the concept of the present invention. For example, the head of the bolt 183 can be on the top of the seat plate 128 instead of underneath as shown in FIG. 22, and the nut 185, or head of the bolt 183 can be rounded like the head of a stove bolt to present a smoother surface on the top of the seat plate 128. When the head of the bolt 183 is on top of the seat plate 128, the head can be welded or other wise secured to the seat plate 128. The hole 176 in the seat plate 128 can be square instead of round as shown to accommodate a stove bolt. Preferably, the nut 185 is the type that doesn't work loose, but can still be removed with normal hand tools. The seat plate 128 could also be mounted on a bearing in a known manner such that it could be rotated while a person is sitting on the stool to allow the user to turn his upper body to different orientations if desired. In this latter modification the back side of the seat plate 128 would not have any seat keepers thereon.

Preferably, but not necessarily, the top of the seat plate 128 is covered with a compressible pad or cushion 129 to make the seat more comfortable. The material used is preferably a closed cell, impermeable, foamed rubber or elastomer to provide a cushion. The cushion 129 can have a cut out 175 to align with the cut out 174 in the seat plate 128 and can have a depression 178 in the underneath side to fit over the nut 185 on top of the seat plate 128. The stool can be left unpainted or be painted in a decorative or camouflage manner.

The most preferred stool just described folds down into a very compact mode for transport and storage, and with greater ease than the other embodiments earlier disclosed herein. Looking at the stool 122 in FIG. 14, the cut out 174 end of the seat plate 128 and cushion 129 are normally closest to the viewer in the use mode. To fold down the stool 122, one grippes the frame 162 near the gripper 127 with one hand and the locking mechanism 125, particularly the thumb or finger pad(s) 161, 160, with the other hand and squeezes the thumb or finger pad(s) back towards the upper support 130 which unlocks the engaging cam(s) 158, 159 from the notch(s)169, 171. The secondary support member 126 is then folded down to be generally parallel with the primary support member 124, facilitated by the notches 142 in the primary support member which become partly filled in the compact mode with lower portions of one side of the seat frame 168.

When the stool reaches the compact mode, preferably the engaging cam(s) 158, 159 are pushed into compact mode locking notch(es) 187, 188 in the top of the frame 162 just outboard of the seat mounting hole 172. This feature, which is optional since the stool tends to stay in the compact mode, locks the stool 122 in the compact mode, an added safety and convenience feature.

To render the stool 122 easier to carry, the seat plate 128 can now be rotated 90 degrees to put the cut out handle 174 in a position such that the longitudinal axis of the cutout is perpendicular with the longitudinal axis of the primary support member 124. To make the stool 122 more compact when it has a primary support member 125 that is adjustable in length, like shown in FIG. 14, the primary support member 124 is adjusted to its shortest length. If desired, a piece of rope, strap or other material can be passed through the cut out 174 in the seat plate 128 and tied in a loop to act as a carrier sling or handle.

It will be obvious to one having the benefit of this disclosure that the portable stools disclosed herein could be modified such that the secondary support folds or pivots out from the compact mode only far enough that the extremities of the gripper would contact the ground to produce, with the primary support, three ground contacts. To make such a modification on the stool shown in FIG. 1, the catch bar 44 (FIG. 4C) would be lengthened, the slot 8 (FIG. 3C) would be lower on the primary support 2, further from the seat end, and the outer surface of the hook 48 would be shaped somewhat differently. While such a modification falls within the broad invention, such an embodiment is not preferred and does not have all the advantages of more preferred embodiments disclosed in detail here.

Having described the invention in a broad manner with numerous specific embodiments,

I claim:

1. A portable stool that contacts the ground in only one area, said area being less than ten square inches, that also contacts a generally vertical structure for stability in a use mode and that can be easily and quickly converted from the use mode into a compact mode for transport and storage and quickly and easily converted back into the use mode, comprising:

a primary support member for supporting a major portion of the weight of a person, said primary support member having only one end for contacting the ground in said area, the ground contacting area of said one end of the primary support being less than 10 square inches, said primary support member being no more than 30 degrees from true vertical in the use mode, a secondary support member rigidly, but rotatably, attached to said primary support member at one longitudinal end, said secondary support member having a gripper on another longitudinal end for contacting the generally vertical structure in a non-sliding manner when in the use mode and being rotatable to transform the stool from the use mode to the compact mode, said secondary support member being generally horizontal in the use mode, and a seat that is attached to either the primary support member or the secondary support member in the use mode, said seat, when attached to said secondary support member, is attached at a location adjacent to said primary support member such that in the use mode a major portion of the weight of a person sitting on said seat is supported by said primary support member with the secondary support member mainly providing stability to said stool in the use mode while transferring only a minor portion of the said weight to said structure, said seat having a length and a width, the length being substantially greater than the width, the seat being attached in either a rotatable or removable manner such that in the use mode a side-to-side dimension of said seat which is the length of said seat, is perpendicular to said secondary support member and in the compact mode said seat is attached to either the primary support member or the secondary support member with the length of said seat being parallel to the secondary support member, and said primary support member being of a length that said seat, in the use mode, is spaced from the ground such that when said person is sitting on said seat with the person's back against the generally vertical structure, the person can have at least one foot on the ground to provide stability and to be able to stand up on the ground.

2. The stool of claim 1 wherein said secondary support member is generally parallel to the primary support member when in said compact mode and forms an angle of at least 60 degrees with said primary support member when in the use mode.

3. The stool of claim 2 wherein said area is less than six square inches and wherein said primary support member is no more than 15 decrees from true vertical when in the use mode.

4. The stool of claim 2 wherein said seat is attached to said secondary support member in both the use mode and in the compact mode.

5. The stool of claim 2 wherein said stool has a latch mechanism attached to either the primary support member or the secondary support member, said latch mechanism having one or more elements that engages one or more elements on the other support member to releasably lock the stool in the use mode and wherein said primary support is a structural member selected from a group consisting of a C channel, a box channel, a pipe, a rod, an I beam, and an arc.

6. The stool of claims wherein the latch is on the primary support member and the element that this latch engages on the secondary member to lock the secondary support member in the use mode is one or more notches in an element of the secondary support member.

7. The stool of claim 5 wherein said latch also locks said secondary support member in the compact mode.

8. The stool of claim 5 wherein said latch also locks said secondary support member in the compact mode.

9. The stool of claim 2 wherein said seat is attached to said secondary support member when said stool is in the compact mode.

10. The stool of claim 9 wherein said secondary support member has a latch that cooperates with a slot in the primary support member to lock said secondary support member into the generally horizontal position in the use mode.

11. The stool of claim 10 wherein the latch comprises a pivoting bar biased in one direction, said pivoting bar having a hook on each end.

12. The stool of claim 11 wherein said seat is locked to the primary support member in the compact mode by one of the hooks on said pivoting bar.

13. A portable stool that contacts the ground in only one area, said area being less than ten square inches, and that contacts a generally vertical structure for stability in a use mode and that can be easily and quickly converted from a compact mode to the use mode and easily and quickly converted back to the compact mode comprising:

first means for supporting a major portion of a person's weight and for contacting the ground at said area, said first means for supporting being no more than 30 degrees from true vertical when in the use mode, second means having first and second longitudinal ends for stabilizing a seat on said stool by contacting a generally vertical structure at the second longitudinal while transferring only a minor portion of the person's weight to said structure, said second means being rigidly, but pivotly attached at the first longitudinal to said first means with means allowing said second means to pivot with respect to said first means, and a seat attached to either of said first or second means for supporting the person, said seat supported primarily by said first means for supporting when in a use mode, said seat, when attached to said second means is attached at a location that is adjacent said first means, said seat having a length and a width, the length being substantially greater than the width, the seat being attached in either a rotatable or removable manner such that in the use mode a side-to-side dimension of said seat, the length of said seat, is perpendicular to said second means and in the compact mode said seat is attached to either the first means or the second means with the length of said seat being parallel to the second means, and said second means for supporting being generally horizontal in the use mode and not parallel to said first means, said second means being generally parallel to said first means for supporting when said stool is in said compact mode, and said first means being of a length to space the seat from the ground in the use mode such that the person can have at least one foot on the ground, while sitting on the seat with the person's back against said generally vertical structure, for stability and to enable the person to stand up on the ground.

14. The stool of claim 13 further comprising means on one end of said second supporting means for contacting said generally vertical structure in a non-sliding fashion.

15. The stool of claim 14 further comprising means for locking said second means for supporting in a fixed position with respect to said first means for supporting when said stool is in the use mode and wherein said first supporting means is a structural member selected from a group consisting of a C channel, a box channel, a pipe, a rod, an I beam, and an arc.

16. The stool of claim 15 further comprising means for locking said second means for supporting in a fixed position with respect to said first means for supporting when said stool is in the compact mode.

17. The stool of claim 14 wherein said area is less than six square inches with said first means for supporting being no more than 15 degrees from true vertical when in the use mode.

18. The stool of claim 14 wherein the means for gripping includes means for biasing said means for gripping to a closed orientation.

19. The stool of claim 13 wherein said seat is attached to said second means when said stool is in the compact mode.

20. The stool of claim 19 wherein said second means has a latch that cooperates with a slot in the first means to lock said second means into a generally horizontal position in the use mode.

21. The stool of claim 20 wherein the latch comprises a pivoting bar biased in one direction, said pivoting bar having a hook on each end.

* * * * *